(12) United States Patent
Venkatraman

(10) Patent No.: US 11,494,893 B2
(45) Date of Patent: Nov. 8, 2022

(54) SYSTEMS AND METHODS FOR MANAGING PHYSICAL CONNECTIONS OF A CONNECTOR PANEL

(71) Applicant: Verizon Patent and Licensing Inc., Basking Ridge, NJ (US)

(72) Inventor: Srinivas Venkatraman, Edison, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 274 days.

(21) Appl. No.: 16/879,454

(22) Filed: May 20, 2020

(65) Prior Publication Data

US 2021/0366092 A1    Nov. 25, 2021

(51) Int. Cl.
| | |
|---|---|
| *G06K 9/00* | (2022.01) |
| *G06T 7/00* | (2017.01) |
| *G06T 7/50* | (2017.01) |
| *G06K 9/62* | (2022.01) |
| *G06N 20/00* | (2019.01) |
| *H04B 3/46* | (2015.01) |

(52) U.S. Cl.
CPC ............ *G06T 7/001* (2013.01); *G06K 9/6256* (2013.01); *G06N 20/00* (2019.01); *G06T 7/50* (2017.01); *H04B 3/46* (2013.01); *G06T 2207/10004* (2013.01); *G06T 2207/20081* (2013.01)

(58) Field of Classification Search
CPC . G06T 7/001; G06T 7/50; G06T 2207/10004; G06T 2207/20081; G06K 9/6256; G06N 20/00; G06N 5/003; G06N 20/20; H04B 3/46; G06V 10/17; G06V 10/70
See application file for complete search history.

(56) References Cited

U.S. PATENT DOCUMENTS

| | | | |
|---|---|---|---|
| 10,812,988 B1* | 10/2020 | Khan | H04L 41/22 |
| 2013/0031202 A1* | 1/2013 | Mick | G06F 3/00 |
| | | | 709/217 |
| 2016/0134484 A1* | 5/2016 | Tanaka | H04L 41/0853 |
| | | | 345/633 |
| 2019/0018955 A1* | 1/2019 | McGrew | G06F 21/566 |

* cited by examiner

*Primary Examiner* — Samir A Ahmed

(57) ABSTRACT

A device may receive, from a user device, connector panel information associated with a connector panel. The connector panel may provide a connection, via a port, for a service of a network. The device may receive an image that depicts a physical configuration of the connector panel. The device may process, using a port analysis model, the image to identify a port status of a port of the connector panel. The device may determine, based on the port status, that the port is available for the connection. The device may provide, to the user device, instructions for using the port for the connection. The device may obtain a verification that the connection has been established via the port. The device may perform one or more actions associated with providing the service.

20 Claims, 17 Drawing Sheets

115
Port analysis model is trained based on historical images of connection panels Connection Management System
110

SYSTEMS AND METHODS FOR MANAGING PHYSICAL CONNECTIONS OF A CONNECTOR PANEL

BACKGROUND

A connector panel includes an array of ports. Each port connects, via a wired connection, to another port on the connector panel to form pairs of connected ports. A cable can be used to connect a port on a device to a port of a pair of connected ports. Another cable can be used to connect the other port of the pair of connected ports to a port on another device to establish a wired connection between the two devices.

DETAILED DESCRIPTION OF PREFERRED EMBODIMENTS

Figure 1A:
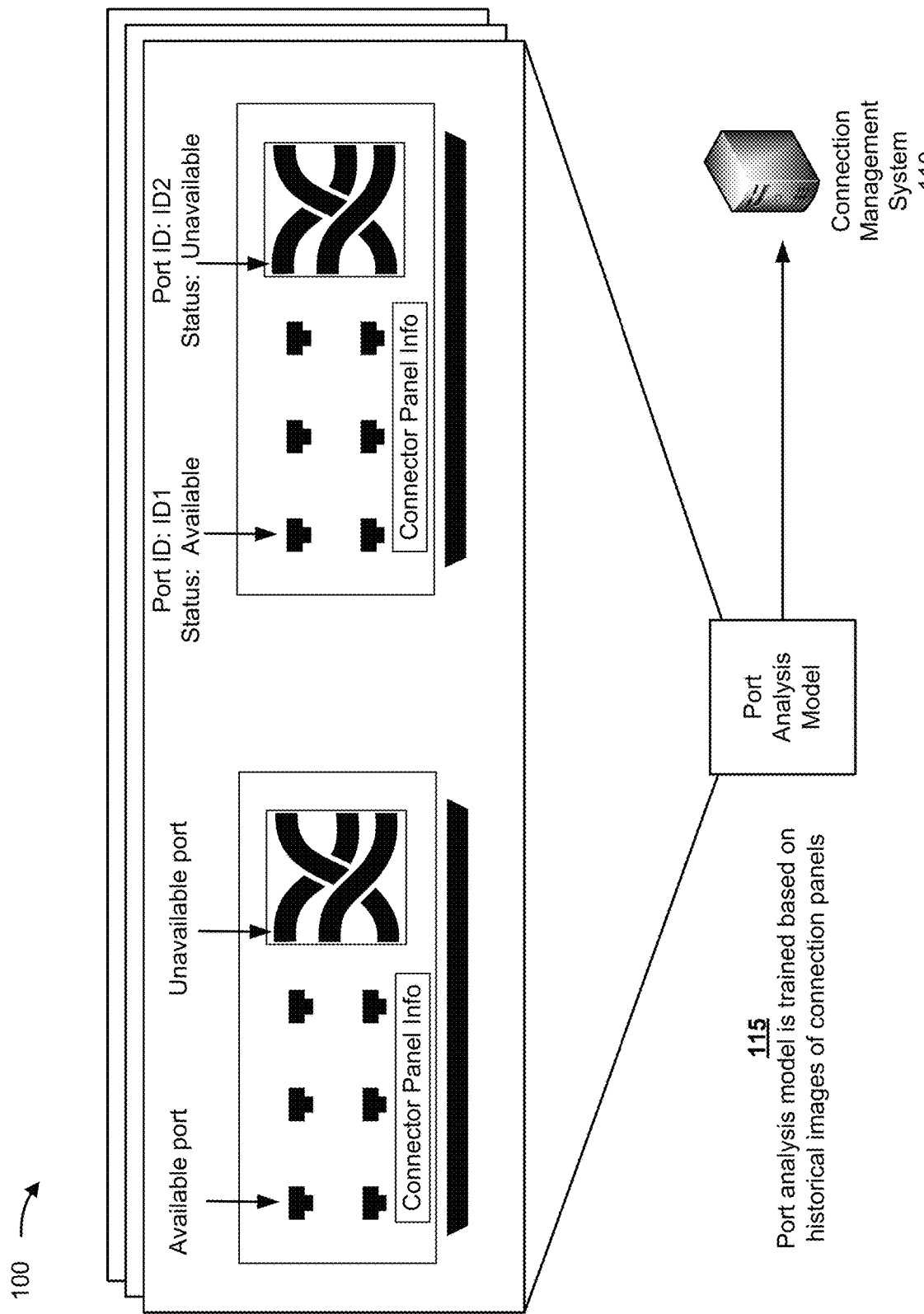
FIGS. 1A-1G are diagrams of one or more example implementations described herein.

The following detailed description of example implementations refers to the accompanying drawings. The same reference numbers in different drawings may identify the same or similar elements.

A computing facility (e.g., a server farm, a data center, a central office of an Internet service provider (ISP), and/or the like) may include tens, hundreds, thousands, or more server devices. Each server device may include numerous ports connected to ports on other devices via tens, hundreds, thousands, or more connector panels to form tens, hundreds, thousands, or more individual circuits.

Each individual circuit may be established by a user (e.g., a service technician) manually connecting a cable from a port on a server device to a port on a connector panel, from a port on the connector panel to a port on another connector panel, and so on until finally connecting a port on a last connector panel to a port on another device.

Information identifying the ports and the connector panels used to establish each individual circuit may be stored in a data structure (e.g., a database, a table, a list, and/or the like). When a new circuit is to be established, a device (e.g., an operational support system (OSS) and/or the like) may query the data structure to identify ports of connector panels that are available to establish the circuit. The device may determine a circuit design based on identifying the available ports of the connector panels. The circuit design may identify a series of available ports of connector panels that can used to connect a server device to another device to establish the circuit.

A user may establish the circuit by manually connecting the identified ports using a plurality of cables. In some cases, a particular port on a particular connector panel that is identified in the circuit design may not be available. For example, the port may be damaged, the port may be used to establish another circuit and is incorrectly identified as being available and/or is not identified as being used to establish the other circuit in the data structure, and/or the like.

In these cases, the user may visually scan the particular connector panel and may identify an available port. The user may use the available port to establish the circuit rather than the port identified in the circuit design. If the user fails to input information into the data structure indicating that the particular port is not available and/or information identifying the port the user used to establish the circuit, the device may continue to provide circuit designs identifying ports that are not available to be used to establish a circuit.

Alternatively, the user may return to the device, input information indicating that the particular port is not available into the data structure, and cause the device to generate a new circuit design. The user may establish the circuit by manually connecting the ports identified in the new circuit design. The new circuit design may be different from the previous circuit design and the user may have to remove connections that the user previously established based on the previous circuit design.

Thus, current techniques waste computing resources (e.g., processing resources, memory resources, communication resources, and/or the like), networking resources, human resources, and/or the like by incorrectly identifying a port on a connector panel as available, correcting the circuit design for the network service, and/or the like.

Some implementations described herein provide a connection management system that utilizes machine learning to identify a port on a connector panel that is available for establishing a circuit. In some implementations, a user device may capture an image of a connector panel and may provide the image to the connection management system. The connection management system may input the image into a machine learning model. The machine learning model may analyze the image and may output information identifying an available port based on the analysis. The connection management system may provide the information identifying the available port to the user device. The available port may be used to establish the circuit based on the information identifying the available port.

By determining the available port based on the image of the connector panel, rather than based on data stored in a data structure, the connection management system may not need to generate a circuit design. In this way, the connection management system may conserve computing resources that would otherwise have been utilized to query a data structure to identify available ports for each connector panel and/or to generate a circuit design based on the available ports.

In some implementations, the user device may capture an image of the control panel after the available port is used to establish the circuit. The connection management system may receive the image and may verify that the circuit has been established using the available port. The connection management system may update circuit information stored in a data structure based on verifying that the circuit has been established using the available port. The circuit information may be updated to identify the port as being used to establish the circuit. In this way, the connection management system may ensure that the information stored in the data structure is accurate.

Thus, the connection management system reduces time required to establish a circuit and conserves computing resources, networking resources, human resources, and/or the like that would otherwise have been used to incorrectly identify a port on a connector panel as available, generate a circuit design, correct the circuit design, and/or the like.

FIGS. 1A-1G are diagrams of one or more example implementations 100 described herein. As shown in FIGS. 1A-1G, a user device 105 is associated with a user (e.g., a technician) and a connection management system 110. In some implementations, the user device 105 may include a mobile device, a computer, a smart phone, and/or the like that the user may utilize to provide information to and/or receive information from connection management system 110. The connection management system 110 may include a system or platform that utilizes a machine learning model to maintain and manage ports on connector panels, commonly referred to a patch panels, included in a facility, such as a server farm, a data center, a communications closet, a central office, and/or the like.

In some implementations, the connection management system 110 may generate a machine learning model (e.g., a port analysis model, as shown in FIG. 1A) that identifies ports included on a connector panel and classifies the ports as available or unavailable based on an image of the connector panel. As shown in FIG. 1A, and by reference number 115, the connection management system 110 trains the port analysis model based on historical images of connector panels. In some implementations, the connection management system 110 trains the port analysis model as described below in connection with FIG. 3.

For example, the connection management system 110 may train the port analysis model based on one or more parameters associated with a connector panel, such as a type of the connector panel, a model of the connection panel, a number of ports included on the connector panel, information identifying a location of the ports within the image (e.g., information identifying a bounding box encompassing a port included on the connector panel), and/or the like. The connection management system 110 may train the port analysis model using the historical images and the one or more parameters. Using the historical images and the one or more parameters as inputs to the port analysis model, connection management system 110 may train the port analysis model to identify ports of a connector panel and/or to classify a port as being available or unavailable based on an image of the connector panel.

The historical images of the connection panels may depict physical configurations of the connection panels. In some implementations, the connection management system 110 may obtain the historical images from a data structure. For example, the connection management system 110 may obtain a plurality of images of connector panels from a data structure hosted by a third-party server device. The plurality of images may include annotations including information identifying values for the one or more parameters used to train the port analysis model. For example, an image of a connector panel may include an annotation including information identifying a type of the connector panel, a model of the connector panel, a number of ports on the connector panel, whether a port is available or unavailable, and/or the like.

In some implementations, the connection management system 110 may obtain the historical images from the user device 105. For example, the connection management system 110 may be associated with a facility that includes thousands of connector panels. A user, a robot, a drone, and/or the like may use the user device 105 to capture images of the connector panels and/or provide the images to the connection management system 110.

The connection management system 110 may utilize the trained port analysis model to identify and/or classify ports on a connector panel as part of a process for performing diagnostics on the connector panel. In some implementations, the connection management system 110 may utilize the trained port analysis model to identify and/or classify the ports in a manner similar to that described below with respect to FIG. 4.

Figure 1B:
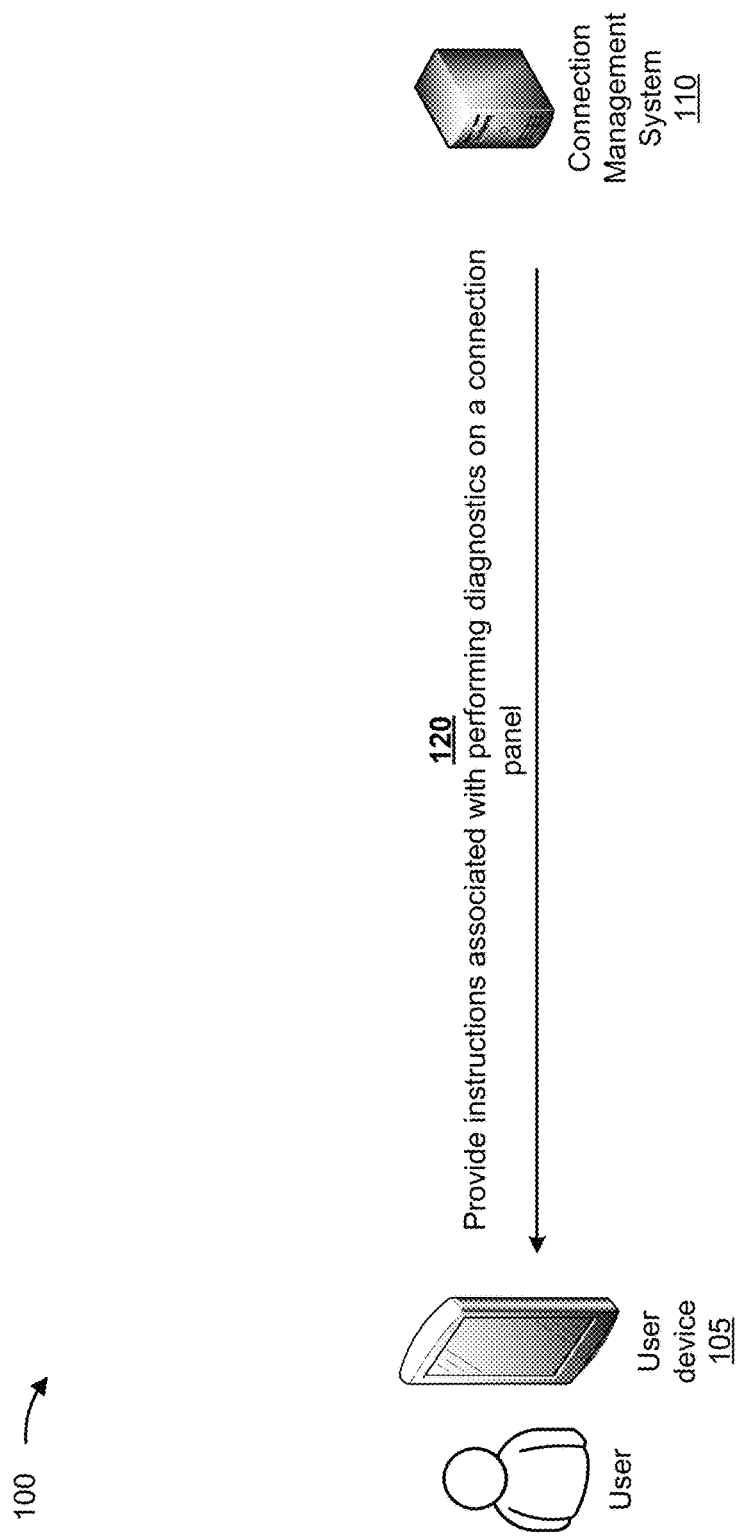

As shown in FIG. 1B, and by reference number 120, the connection management system 110 provides instructions associated with performing diagnostics on a connector panel to the user device 105. In some implementations, the connection management system 110 may provide the instructions to the user device 105 via an application installed on the user device 105.

The user device 105 may receive, from the connection management system 110 or from another source, an application associated with capturing site and/or connector panel data for a connector panel. In some implementations, the user may utilize user device 105 to download the application from the connection management system 110 (or from the other source), and to install the application. Once user device 105 installs the application, the user may utilize user device 105 to set up the application. For example, the application may request that the user provide credentials (e.g., a user name, a password, an employee identifier, and/or the like) for accessing the application.

The application may provide instructions associated with performing diagnostics on the connector panel for display to the user. The instructions may include information indicating that the user is to provide site and/or connector panel information to the connection management system 110.

In some implementations, the instructions indicate that the user is to use the user device 105 to capture an image of a portion of the connector panel that includes the site and/or connector panel information. For example, the instructions may indicate that the user is to use the user device 105 to capture an image of a sticker, an information plate, a barcode, and/or the like that includes the site and/or connector panel information and is attached to a portion of the connector panel. The user may use the user device 105 to capture an image of the portion of the control panel that includes the site and/or connector panel information.

Figure 1C:
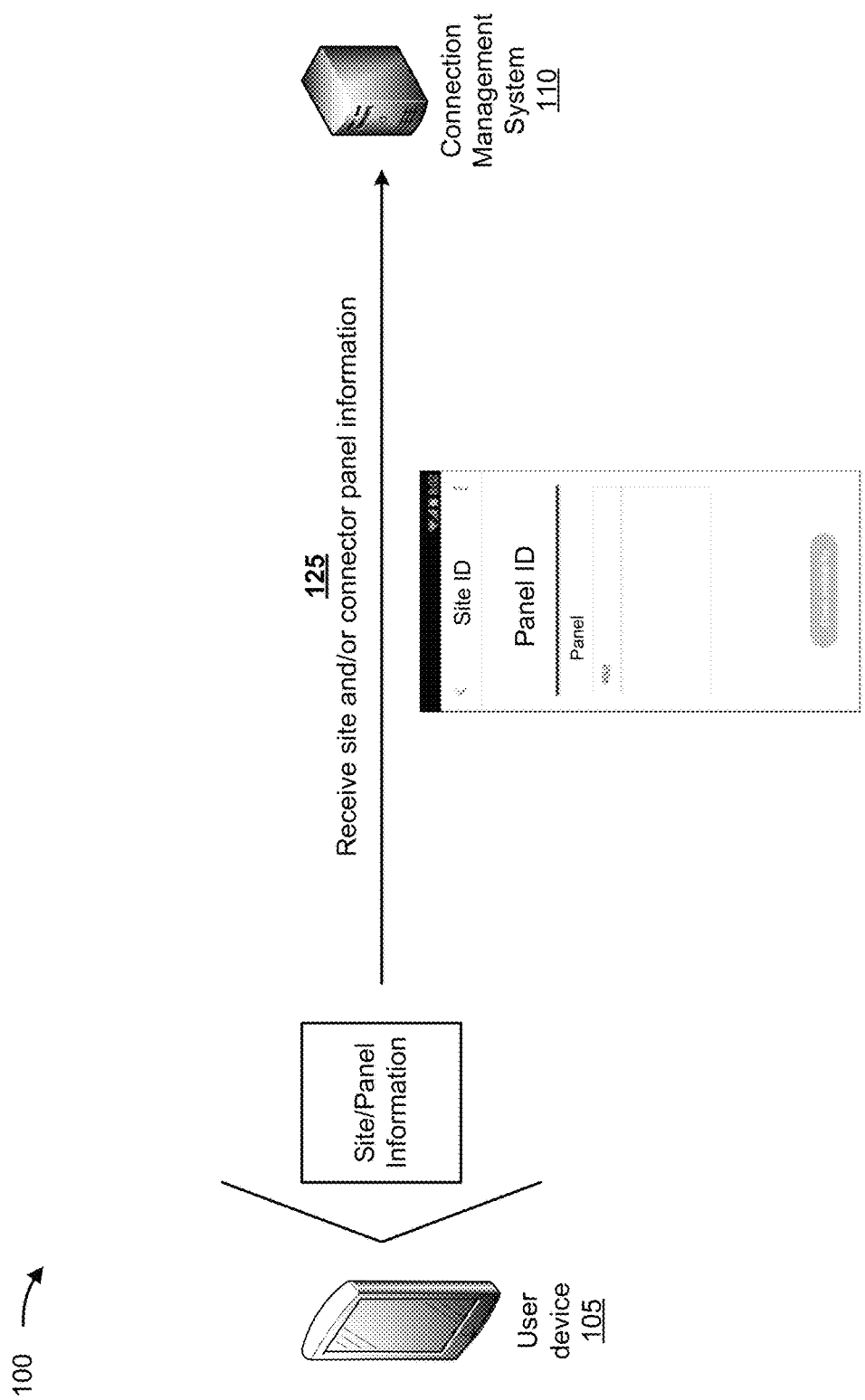

In some implementations, as shown in FIG. 1C, the instructions may indicate that the user is to manually enter the site and/or connector panel information via a user interface associated with the application. For example, the instructions may include a series of prompts requesting the user to input one or more items of site and/or connector panel information. The user may enter the requested information via the user interface.

In some implementations, the user device 105 may automatically obtain one or more portions of the site and/or connector panel information. The user device 105 may include a device for determining a location of the user device 105 (e.g., a location of the user), such as a GPS device. The user device 105 may cause the device to obtain location information associated with the location of the user device 105 based on receiving the instructions from the connection management system 110. The location information may include information identifying a geographic location of the user device 105 (e.g., a latitude, a longitude, and/or the like), information identifying a location of the user device 105 within the facility (e.g., information identifying a floor number (e.g., first floor, second floor, and/or the like), and/or the like), a room number, and/or the like).

In some implementations, the user device 105 may receive the connector panel information from the connector panel. For example, the user device 105 may receive the connector panel from a passive RFID device included on the connector panel. The user device 105 may include an active RFID device that provides a signal to the passive RFID device. The passive RFID device may harvest energy from the signal and may use the harvested energy to provide the connector panel information to the user device 105.

As shown in FIG. 1C, and by reference number 125, the connection management system 110 receives site and/or connector panel information from the user device 105. In some implementations, the connection management system 110 receives the image of the portion of the control panel. The connection management system 110 may analyze the image (e.g., perform optical character recognition (OCR) and/or the like) and may determine the site and/or connector panel information based on a result of analyzing the image. In some implementations, the connection management system 110 may receive data corresponding to the site and/or connector panel information and may determine the site and/or connector panel information based on a reading the site and/or connector panel information from the received data.

The connection management system 110 may verify that the user is at the correct connector panel based on the site and/or connector panel information received from the user device 105. In some implementations, the connection management system 110 may verify that the user is at the correct connector panel based on comparing the site and/or connector panel information included in the instructions and the site and/or connector panel information received from the user device 105. Alternatively, and/or additionally, the connection management system 110 may verify that the user is at the correct connector panel based on the location information. The connection management system 110 may determine whether the location information received from the user device 105 corresponds to the location of the connector panel for which the diagnostics are to be performed.

In some implementations, the connection management system 110 may determine that the user is not at the correct connector panel. For example, the connection management system 110 may determine that the site and/or connector panel information included in the instructions does not match the site and/or connector panel information received from the user device 105. The connection management system 110 may provide information indicating that the user is not at the correct connector panel and/or that the user is to go to a location of the correct connector panel to the user device 105.

The user device 105 may receive the information from the connection management system 110 and may provide the information to the user (e.g., via the user interface associated with the application). The user may go to a location of the correct connector panel based on the information. The user may use the user device 105 to provide the connection management system 110 with site and/or panel information for the correct connector panel in a manner similar to that described above.

In some implementations, the connection management system 110 determines that the user is at the correct connector panel. For example, the connection management system 110 may determine that the site and/or connector panel information included in the instructions matches the site and/or connector panel information received from the user device 105. The connection management system 110 may provide, to the user device 105, information indicating that the user is to provide an image of the ports of the connector panel to the connection management system 110 based on determining that the user is at the correct connector panel.

Figure 1D:
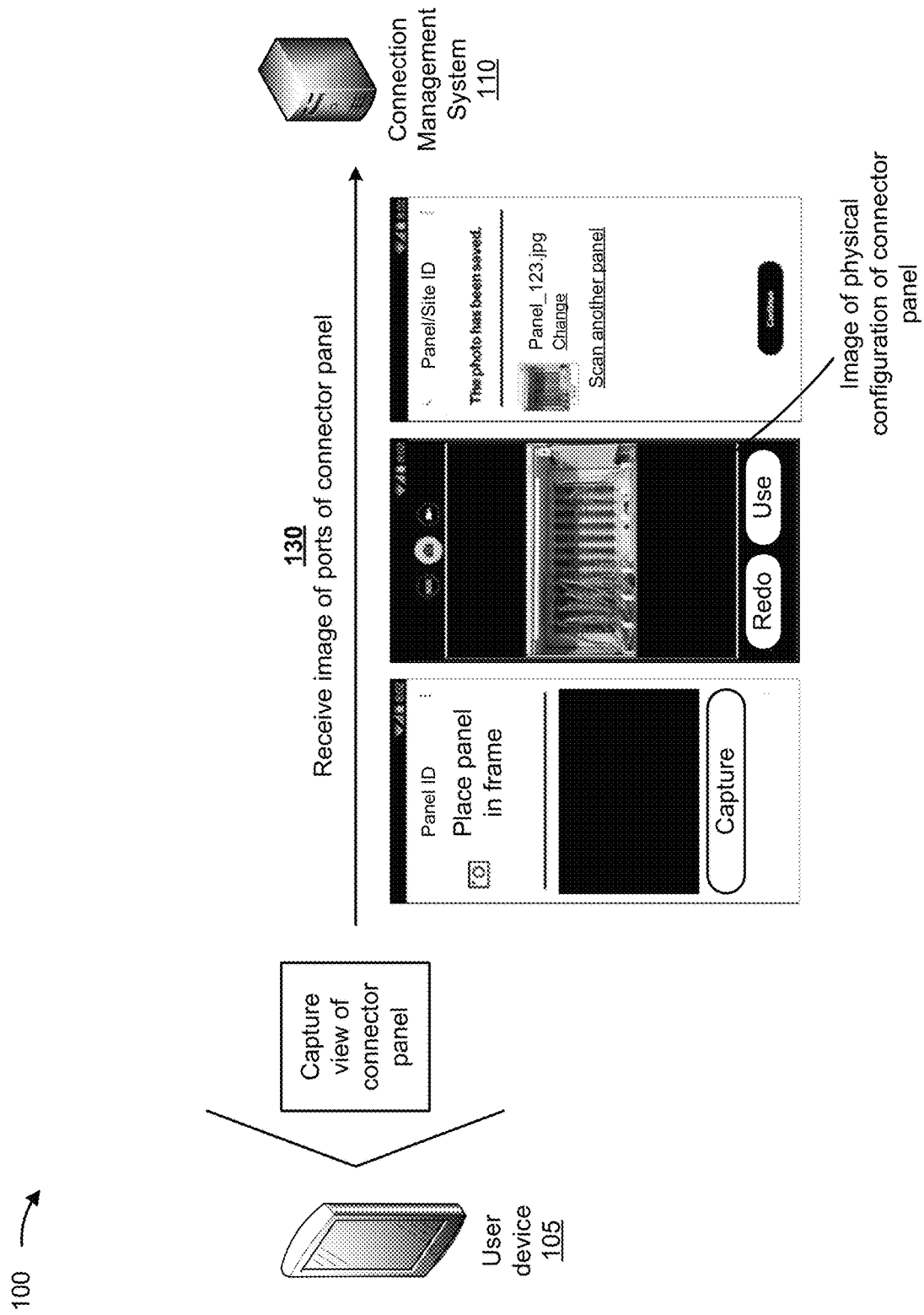

The user device 105 may receive the information from the connection management system 110 and may provide the information to the user. For example, as shown in FIG. 1D, the application may cause a user interface for capturing the image to be presented via a display of the user device 105. The user may use the user device 105 to capture an image of the connector panel. The application may cause the captured image to be displayed to the user.

In some implementations, the image is a still image captured by a camera of the user device 105. In some implementations, the image is a video image captured by the camera of the user device 105. In some implementations, the image is a streaming image captured by the camera and streamed to the connection management system 110 by the user device 105.

The user may review the image and determine whether the image depicts the ports of the connector panel. In some implementations, the user determines that the image does not depict the ports of the connector panel (e.g., the image is blurry, an object included in the image (e.g., the user's finger) is obstructing a view of the ports of the connector panel, and/or the like). The user may provide an input (e.g., select a "Redo" button displayed via the user interface, as shown in FIG. 1D) indicating that the application is to discard the captured image and/or is to enable the user to capture another image of the connector panel. The application may receive the input and may discard the captured image and/or may display the user interface for capturing the image of the control panel based on the input.

In some implementations, the user determines that the image properly or adequately depicts the ports of the connector panel. The user may provide an input (e.g., select a "Use" button displayed via the user interface, as shown in FIG. 1D) indicating that the image is to be provided to the connection management system 110. The application may receive the input and may cause the user device 105 to provide the image to the connection management system 110 based on the input. As shown in FIG. 1D, and by reference number 130, the connection management system 110 receives the image of the ports of the connector panel from the user device 105.

In some implementations, the connection management system 110 selects a port analysis model, from a group of port analysis models, to analyze the image. Each port analysis model may be associated with a respective type of connector panel, a respective panel configuration (e.g., a quantity of ports included on the connector panel, a layout of the ports on the connector panel, and/or the like), and/or the like. The connection management system 110 may determine a panel configuration associated with the connector panel and may select a port analysis model, from the group of port analysis models, associated with the determined panel configuration.

In some implementations, the connection management system 110 determines the panel configuration based on the image of the ports of the connector panel. The connection management system 110 may analyze the image to determine a quantity of ports included on the connector panel, a layout of the ports on the connector panel, and/or the like. The connection management system 110 may access a data structure storing information associating information identifying a quantity of ports included on the connector panel, information identifying a layout of the ports on the connector panel, and/or the like with information identifying corresponding panel configurations. The connection management system 110 may determine the panel configuration based on the information stored in the data structure.

In some implementations, the connection management system 110 determines the panel configuration based on information obtained from the user device 105. The connector panel information received from the user device 105 may include information identifying a panel configuration of the connector panel. For example, the connector panel information received from the user device 105 may include information identifying a serial number associated with the connector panel, information identifying a model of the connector panel, information identifying a manufacturer of the control panel, and/or the like.

Figure 1E:
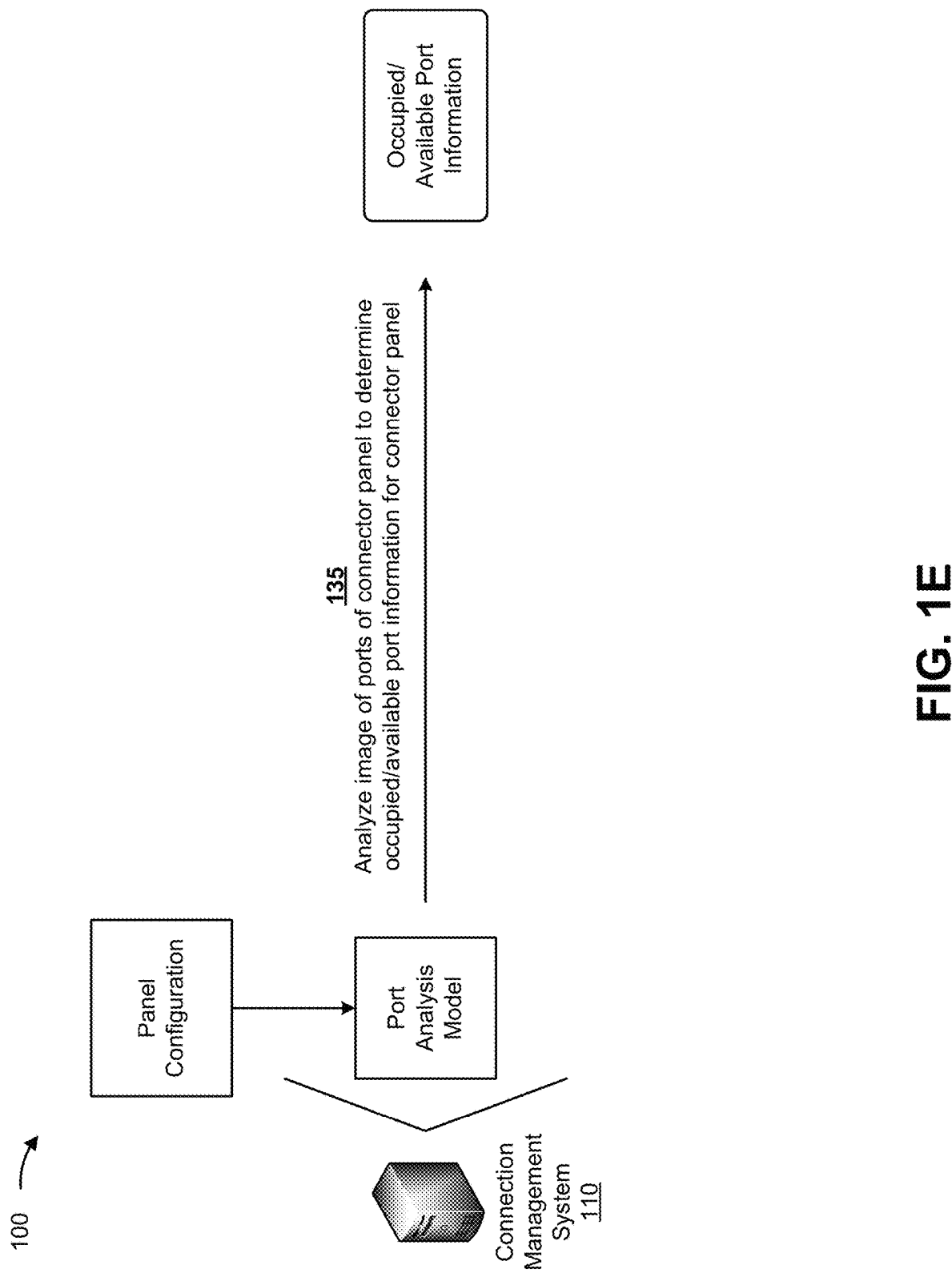

As shown in FIG. 1E, and by reference number 135, the connection management system 110 utilizes the port analysis model to analyze the image of the ports of the connector panel to determine whether each port on the connector panel is available or unavailable. In other words, the model is used to determine which ports are already occupied with a connection and which ports are unoccupied and can accept a new connection. In some implementations, the connection management system 110 utilizes the port analysis model to analyze the image of the ports of the connector panel in a manner similar to that described below with respect to FIG. 4.

The connection management system 110 may provide the image to the port analysis model as an input. The port analysis model may analyze the image to identify bounding boxes for the ports of the connector panel within the image. For example, the port analysis model may utilize an object detection algorithm (e.g., a you-only-look-once (YOLO) algorithm, a single shot multibox detector (SSD) algorithm, and/or the like) to analyze the image to identify bounding boxes for the ports of the connector panel within the image. The port analysis model may determine a layout of the ports based on the locations of the ports within the image. For example, the port analysis model may determine that the ports are arranged in a first quantity of rows and that each row includes a second quantity of connected pairs of ports based on the locations of the ports within the image.

The port analysis model may determine a status (e.g., available, unavailable, damaged, and/or the like) of each port. For example, the port analysis model may determine whether the image depicts a cable extending from a port identified in the image. The port analysis model may determine that the port is available when the image does not depict the cable extending from the identified port. The port analysis model may determine that the port is unavailable when the image depicts the cable extending from the identified port. The port analysis model may determine that the port is damaged when the image of the port depicts that a portion of the port is missing, that the port is fully obstructed, that the port is partially obstructed, and/or the like. In some implementations, the port analysis model may determine that the port is damaged but repairable. The port analysis model may determine that the port is partially obstructed by an object. The port analysis model may determine that the port can be repaired by removing the object. The port analysis model may output a result that includes information identifying the layout of the ports, information identifying a position of the port within the layout of the ports, information indicating the status of the port, information indicating an action to be taken to repair a port having a status of damaged but repairable, and/or the like.

Figure 1F:
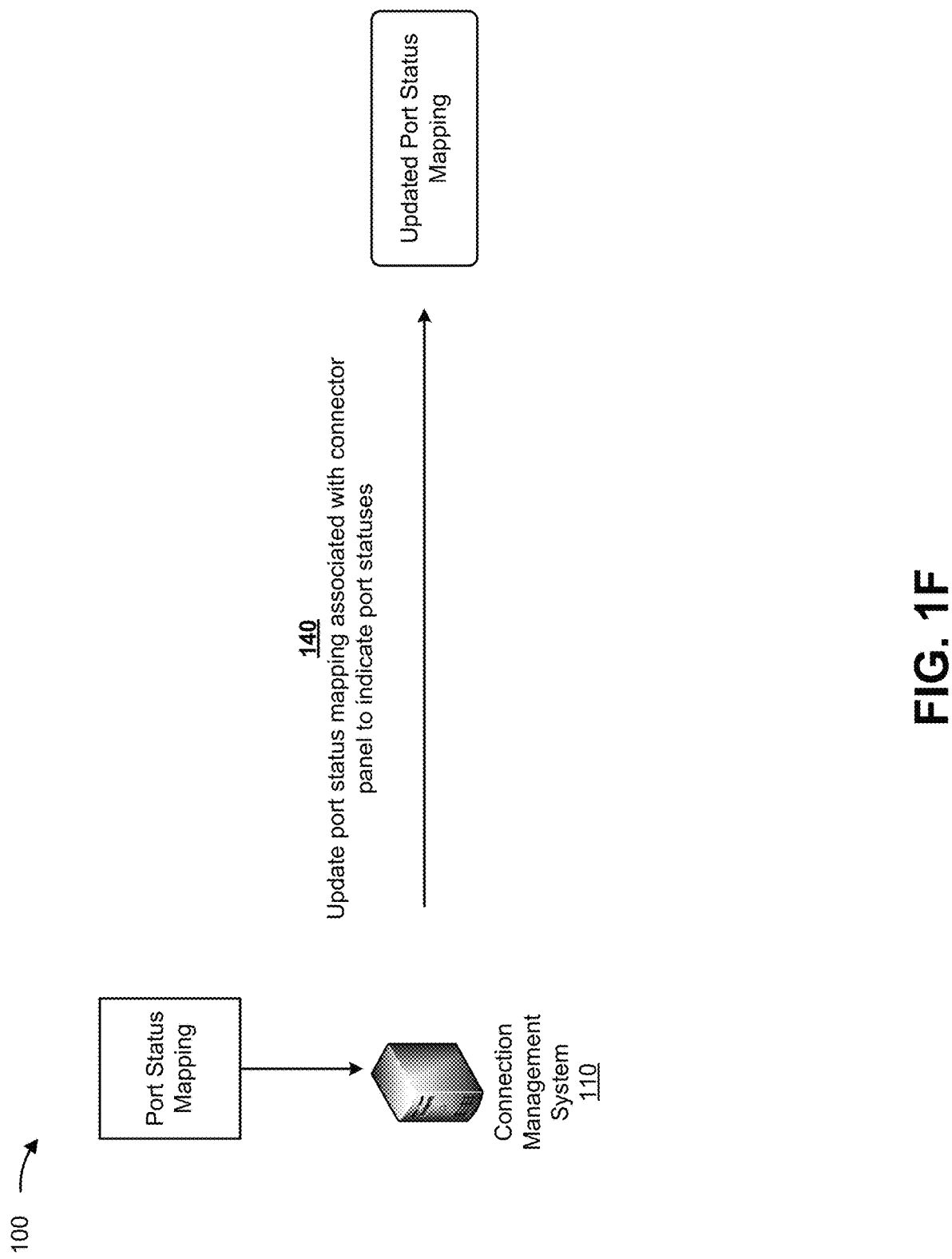

As shown in FIG. 1F, the connection management system 110 obtains a port status mapping associated with the connector panel. The port status mapping may include information identifying the ports included on the connector panel and information indicating a respective status of each of the ports. As shown in FIG. 1F, and by reference number 140, the connection management system 110 updates the port status mapping associated with the connector panel to indicate port statuses determined by the port analysis model.

Figure 1G:
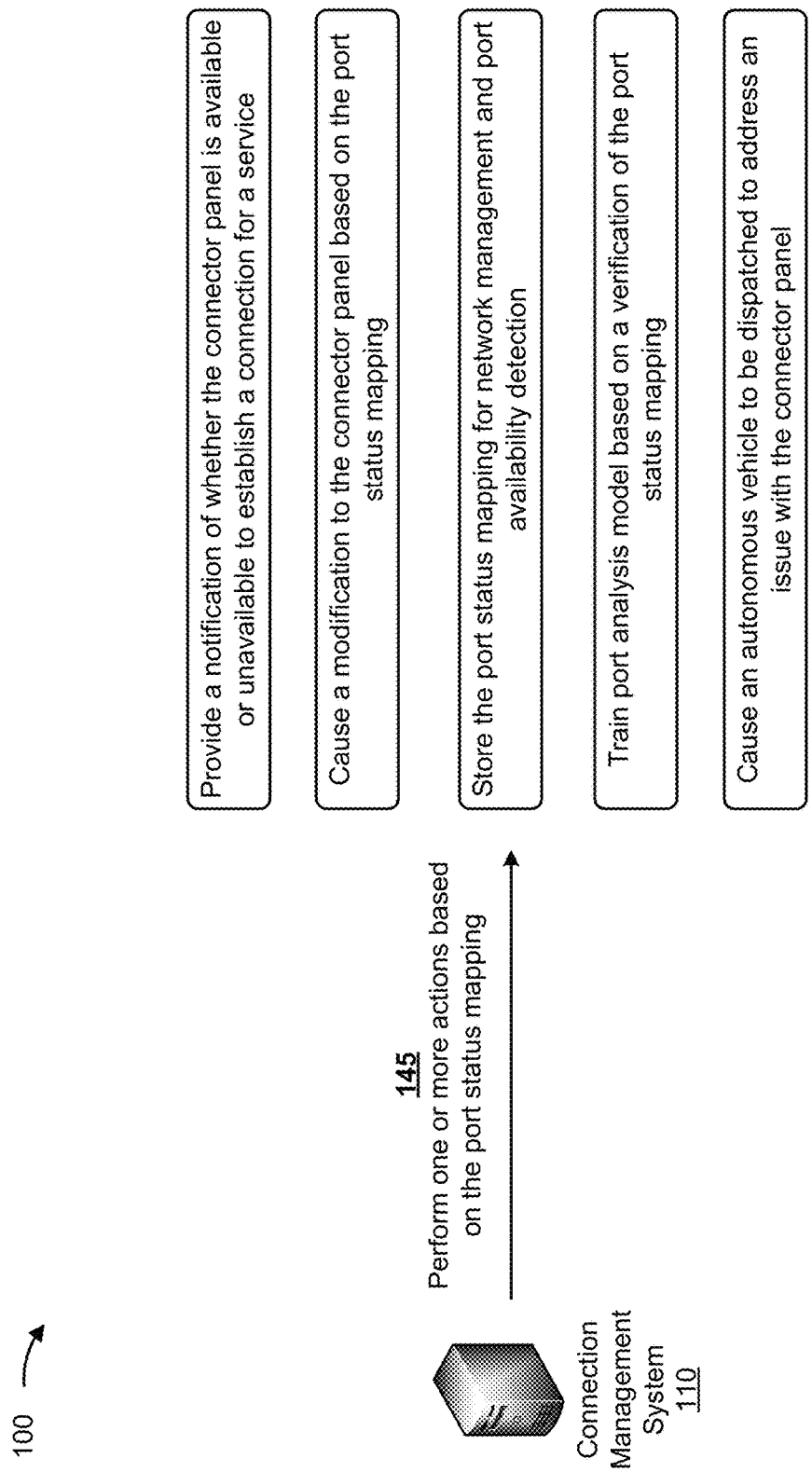

As shown in FIG. 1G, and by reference number 145, the connection management system 110 performs one or more actions based on the updated port status mapping. In some implementations, the one or more actions include providing a notification of whether the connector panel is available or unavailable to establish a connection for a service. The connection management system 110 may determine whether the connector panel includes any available ports based on the updated port status mapping. The connection management system 110 may determine that the connector panel is available for connection for a service (e.g., to be used to establish a circuit) when the connector panel includes one or more available ports. The connection management system 110 may determine the connector panel is not available when the connector panel does not include any available ports. In this way, the connection management system 110 may accurately identify connector panels and/or ports that may be used to establish a circuit.

In some implementations, the one or more actions include causing a modification to the connector panel based on the updated port status mapping. The connection management system 110 may determine that the connector panel does not include any available ports. The connection management system 110 may send information indicating that the connector panel does not include any available ports to the user device 105. The user device 105 may display the information to the user via the user interface of the application. The user may modify the connector panel by adding one or more additional ports to the connector panel, fixing a damaged port, and/or the like. In this way, the connection management system 110 may increase the capacity of the connector panel, thereby conserving resources that may otherwise be wasted by adding additional connector panels.

In some implementations, the one or more actions include storing the updated port status mapping for network management and port availability detection. In this way, the connection management system 110 may ensure that accurate status information for each port of every connector panel is maintained.

In some implementations, the one or more actions include training the port analysis model based on a verification of the updated port status mapping. For example, the connection management system 110 may modify the historical images used to train the port analysis model to include the image of the ports of the connector panel and the results output by the port analysis model, thereby providing additional training images for the port analysis model. In this way, an accuracy of the port analysis model may be increased.

In some implementations, the one or more actions include causing an autonomous vehicle to be dispatched to address an issue with the connector panel. For example, connection management system 110 may cause a robot, an unmanned aerial vehicle (UAV), and/or the like to be dispatched to install, modify, or repair a port on the connector panel based on determining that the connector panel does not have any available ports, that a port on the connector panel is damaged, and/or the like. In this way, user device 105 may automatically improve the connector panel, thereby conserving resources that would otherwise be wasted addressing the issue.

As indicated above, FIGS. 1A-1G are provided as one or more examples. Other examples may differ from what is described with regard to FIGS. 1A-1G. The number and arrangement of devices shown in FIGS. 1A-1G are provided as an example. In practice, there may be additional devices, fewer devices, different devices, or differently arranged than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

FIGS. 2A-2E are diagrams of one or more example implementations 200 described herein. As shown in FIGS. 2A-2E, a user device 205 is associated with a user (e.g., a technician) and a connection management system 210. In some implementations, the user device 205 may include a mobile device, a computer, a smart phone, and/or the like that the user may utilize to provide information to and/or receive information from connection management system 210. The connection management system 210 may include a system or platform that utilizes a machine learning model to maintain and manage ports on connector panels included in a computing facility. In some implementations, the user device 205 corresponds to the user device 105 of FIGS. 1A-1G, and/or the connection management system 210 corresponds to the connection management system 110 of FIGS. 1A-1G.

Figure 2A:
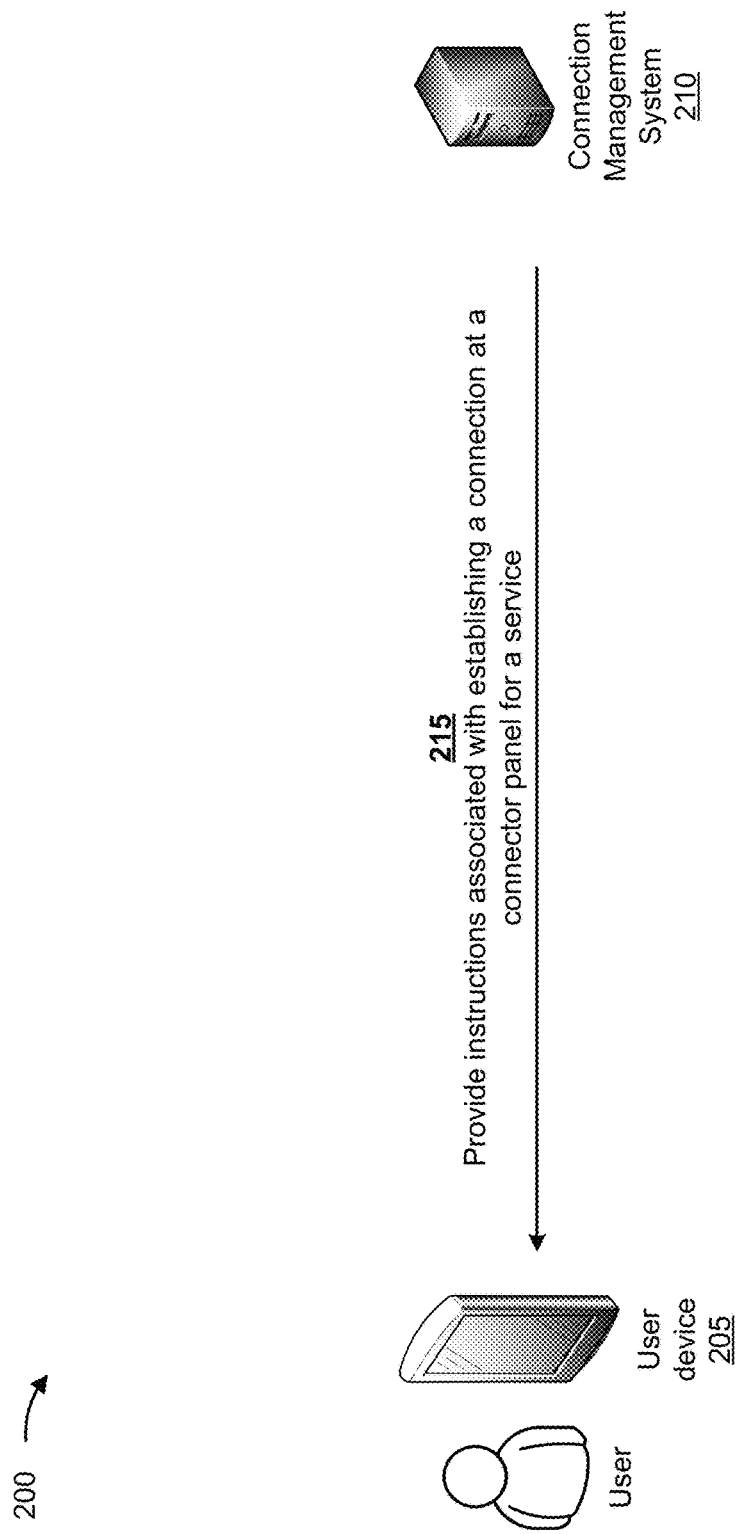
FIGS. 2A-2E are diagrams of one or more example implementations described herein.

As shown in FIG. 2A, and by reference number 215, the connection management system 210 provides instructions associated with establishing a connection at a connector panel for a service. In some implementations, the connection management system 210 may provide the instructions to the user device 205 via an application installed on the user device 205, in a manner similar to that described above with respect to FIG. 1B. The user may receive the instructions via the application and may move to a location of the connector panel to establish the connection.

In some implementations, the user device 205 provides site and/or connector panel information to the connection management system 210 based on receiving the instructions. In some implementations, the user device 205 may enable the user to manually enter the site and/or connector panel information or the user device 205 may automatically capture the site and/or connector panel information in a manner similar to that described with respect to FIG. 1C. The user device 205 may receive the site and/or connector panel information and may provide the site and/or connector information to the connection management system 210.

The connection management system 210 may receive the site and/or connector panel information and may verify that the user is at the correct connector panel. In some implementations, the connection management system 210 may verify that the user is at the correct connector panel in a manner similar to that described above with respect to FIG. 1C.

The user may access the connector panel and may determine that the connector panel includes an available port for establishing the connection. For example, the user may identify a port that does not have a cable extending from the port. The user may use the user device 205 to capture a pre-install image of the connector panel based on determining that the connector panel includes the available port. In some implementations, the user may use the user device 205 to capture the pre-install image and the user device 205 and may provide the image to the connection management system 210 in a manner similar to that described above with respect to FIG. 1D.

In some implementations, the pre-install image includes the site and/or connector panel information. For example, the pre-install image may depict a portion of the connector panel that includes a sticker, an identification plate, a barcode, and/or the like that includes the site and/or connector panel information.

Figure 2B:
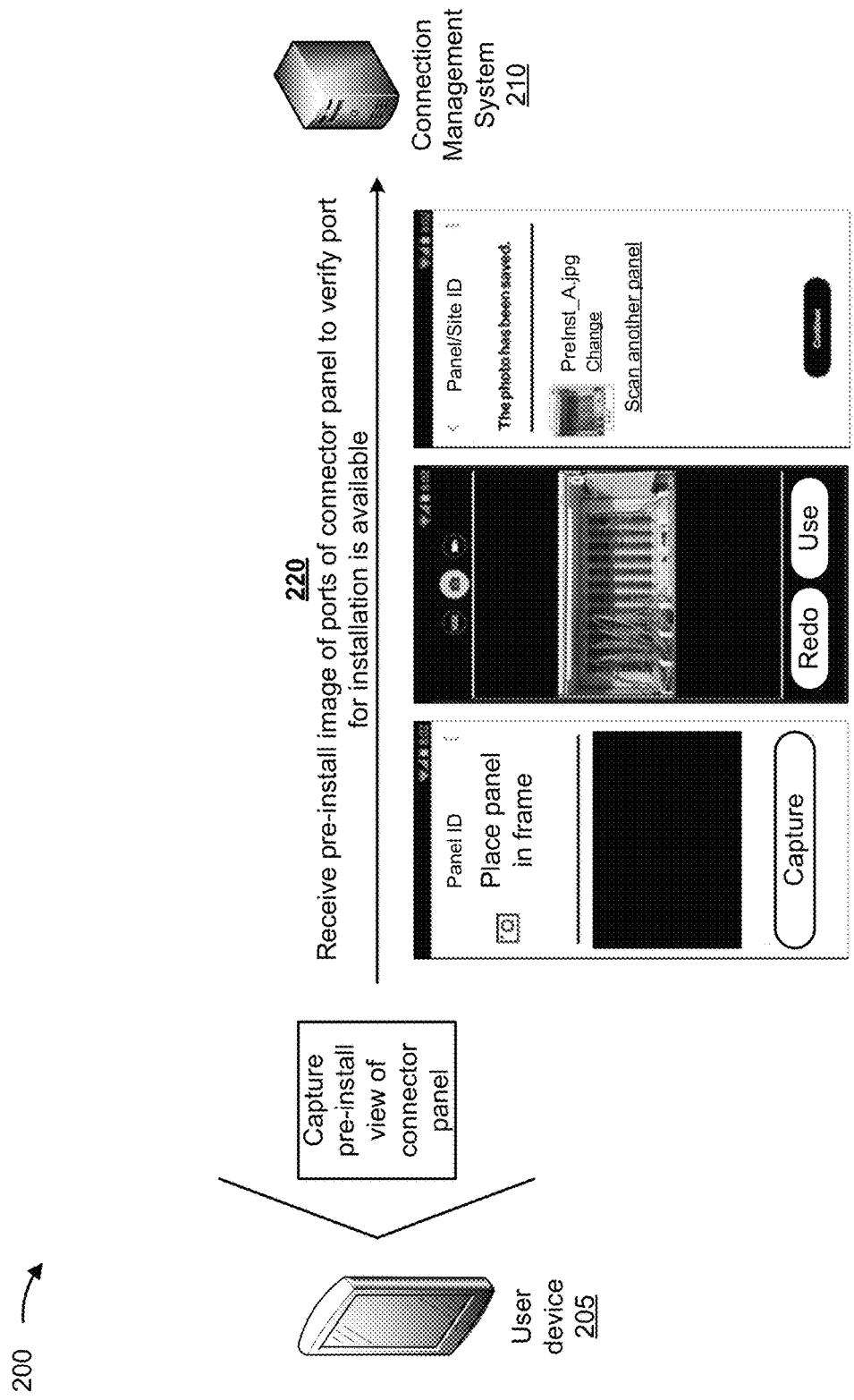

As shown in FIG. 2B, and by reference number 220, the connection management system 210 may receive the pre-install image of ports of the connector panel to verify that a port for installation is available. The connection management system 210 may input the pre-install image into a port analysis model to identify a status of the ports of the connector panel. In some implementations, the port analysis model may determine the status of the ports in a manner similar to that described above with respect to FIG. 1E. The connection management system 210 may verify that a port for the installation of the service is available based on a result output by the port analysis model. For example, the connection management system 210 may verify that a port for the installation for the service is available based on the output of the port analysis model identifying one or more available ports.

Figure 2C:
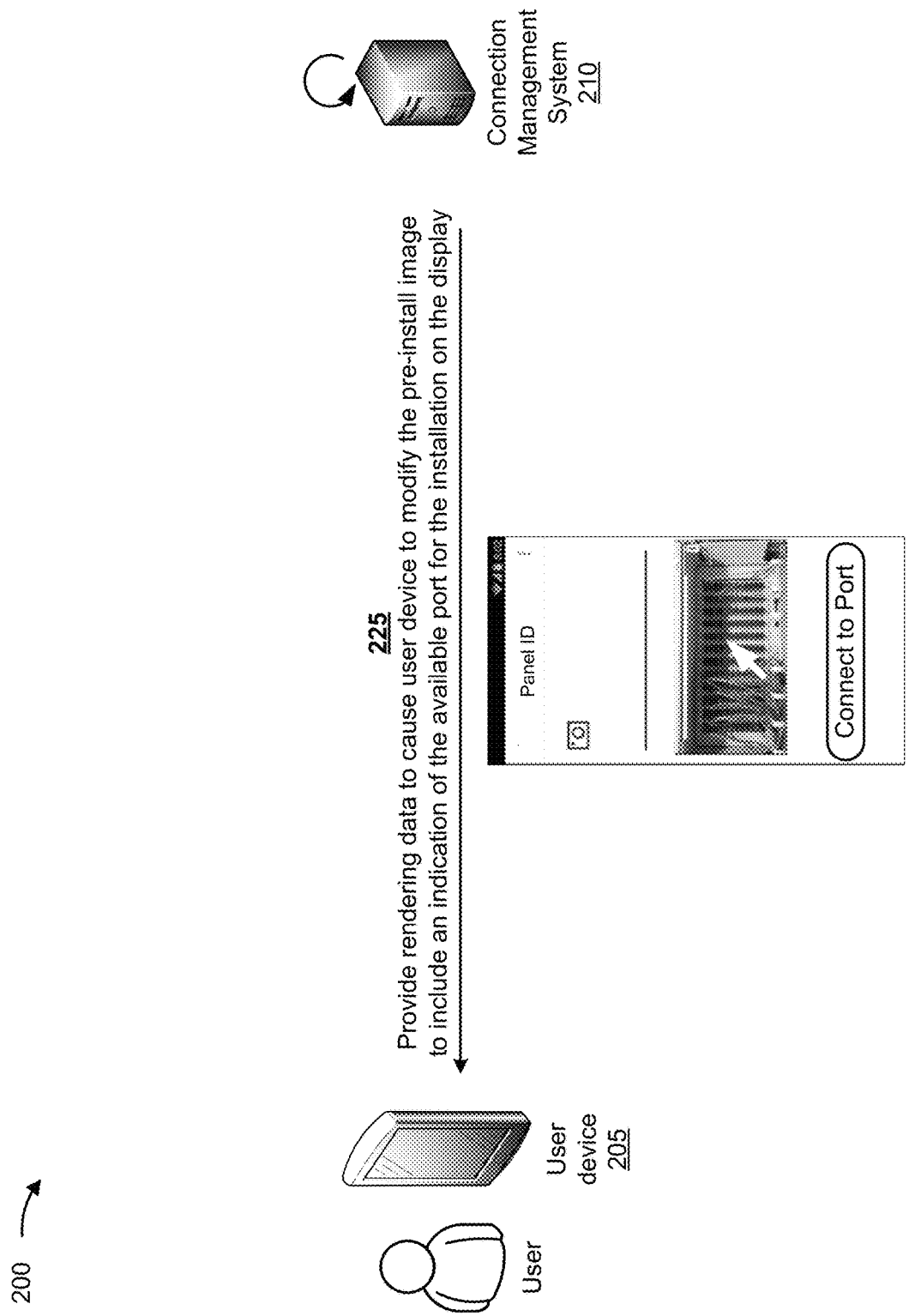

In some implementations, the connection management system 210 provides information verifying the available ports to the user device 205. As shown in FIG. 2C, and by reference number 225, the connection management system provides rendering data to cause the user device 205 to modify the pre-install image to include an indication of the designated port for the installation on the display. The user device 205 may display the modified pre-install image to the user via the user interface of the application. In this way, the connection management system 210 may ensure that the user correctly identifies the port on the connector panel to which the cable is to be connected.

Figure 2D:
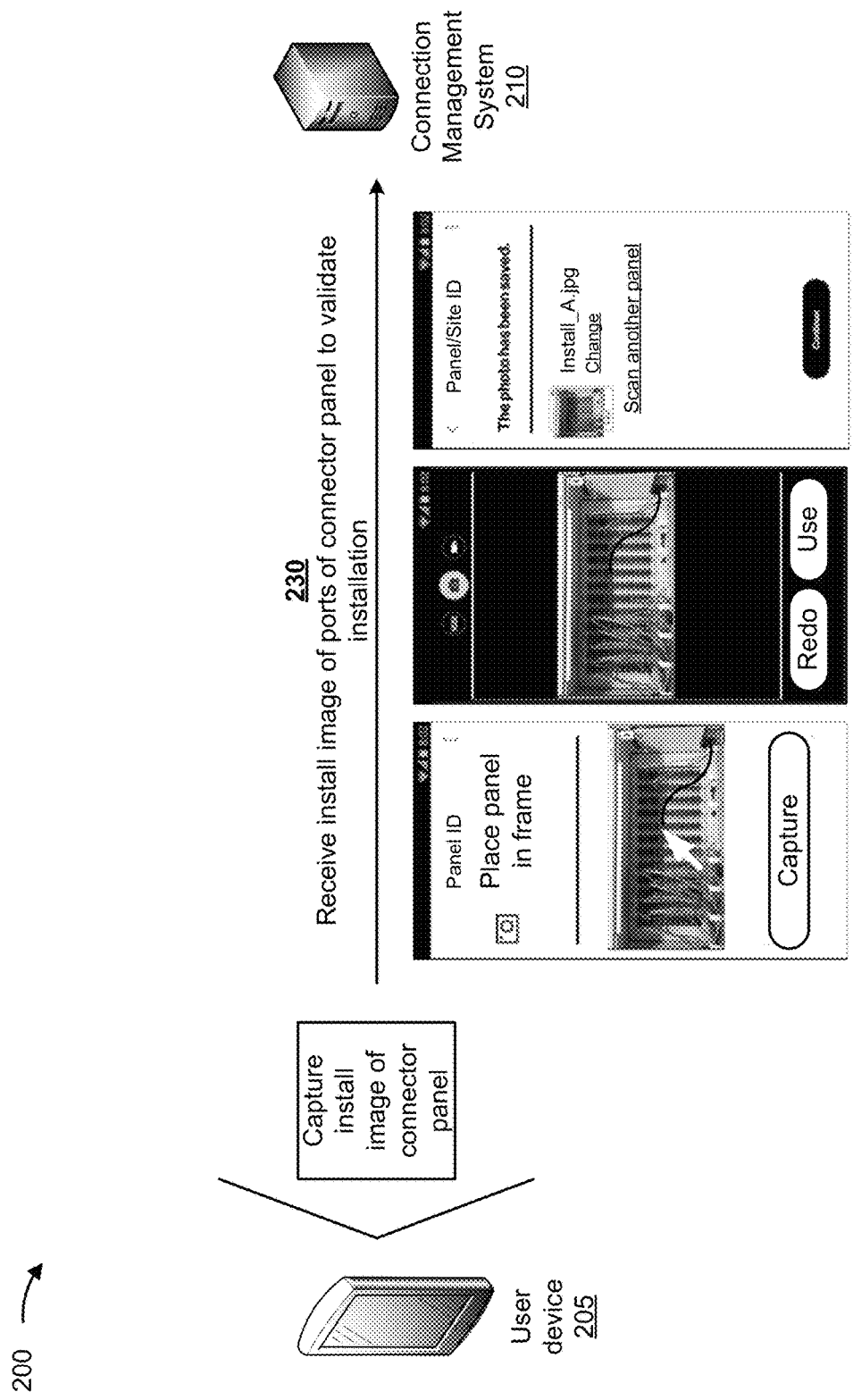

The user may identify the available port and may insert a cable into the available port to establish a connection between the available port and a port on another device (e.g., a port on another connector panel, a port on a server device, and/or the like). As shown in FIG. 2D, the user may use the user device 205 to capture an install image of the connector panel based on inserting the cable into the available port. In some implementations, the user may use the user device 205 to capture the install image of the connector panel in a manner similar to that described above with respect to FIG. 1D. The user device 205 may provide the install image of the connector panel to the connection management system 210.

As shown in FIG. 2D, and by reference number 230, the connection management system 210 receives the install image of the ports of the connector panel to validate installation. The connection management system 210 may utilize the port analysis model to validate the installation. The connection management system 210 may input the install image to the port analysis model. The port analysis model may analyze the install image to identify a status of the ports of the connector panel in a manner similar to that described above with respect to FIG. 1E. The connection management system 210 may compare the result output by the port analysis model based on the pre-install image and the result output by the port analysis model based on the install image to determine whether a status of a port changed from available to unavailable.

The connection management system 210 may validate the installation when the status of the port changed from available to unavailable. The connection management system 210 may determine that the installation is invalid when the status of the port does not change from available to unavailable and/or when a status of a port changes from unavailable to available (e.g., due to the user disconnecting a cable from a port).

Figure 2E:
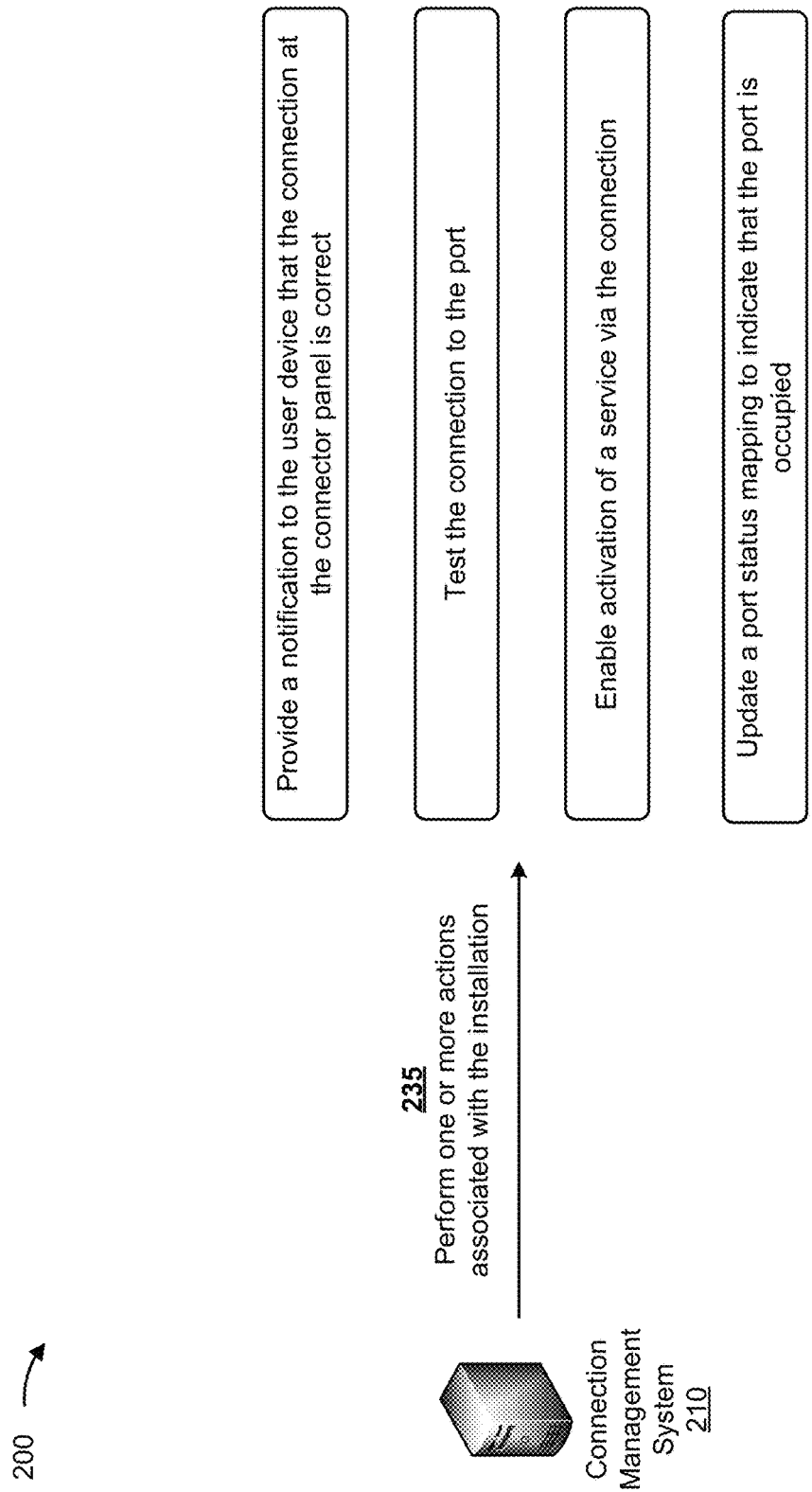

As shown in FIG. 2E, and by reference number 235, the connection management system 210 performs one or more actions associated with the installation. In some implementations, the one or more actions include providing a notification to the user device 205 that the connection at the connector panel is correct. For example, the connection management system 210 may provide a notification to the user device 205 indicating that the connection at the connector panel is correct based on validating the installation.

In some implementations, the one or more actions include testing the connection to the port. The connection management system 210 may provide a notification to the user device 205 that the connection management system 210 is going to test the connection to the port. The user device 205 may receive the notification and may provide the notification to the user. The user may connect a testing device (e.g., the user device 205, a multimeter, and/or the like) to an end of the cable extending from the port. The connection management system 210 may transmit a signal to the port to test the connection to the port. The testing device may receive the signal and provide an output (e.g., a notification, a tone, a movement of a needle, and/or the like) indicating that the testing device received the signal. The user may input information indicating that the testing device received the signal via the user interface. The user device 205 may provide the information indicating that the testing device received the signal to the connection management system 210. The connection management system 210 may receive the information and may determine that the test was successful based on receiving the information.

In some implementations, the connection management system 210 may cause a device connected to the port to transmit a signal to the port to test the connection to the port. The connection management system 210 may maintain a data structure storing information identifying ports used to connect a device to another device. The connection management system 210 may query the data structure to identify the device connected to the port. The connection management system 210 may send an instruction to the device to cause the device to transmit a signal to test the connection to the port. The device may transmit a signal to test the connection based on the instruction and may send a result of the test to the connection management system 210. The connection management system 210 may determine that the test was successful based on the result.

In some implementations, the connection management system 210 may determine that the test was not successful. In these implementations, the connection management system 210 may provide a notification to the user device 205. The notification may include information indicating that the test was not successful, information identifying another available port on the connector panel, information indicating that the user is to remove the connection to the port, information indicating that the user is to repeat the process for identifying an available port and establishing the connection, and/or the like.

Alternatively, and/or additionally, the connection management system 210 may modify a port status mapping to indicate that the port is damaged. For example, the connection management system 210 may modify the port status mapping to change a status of the port to indicate that the port is damaged.

In some implementations, the one or more actions include enabling activation of a service via the connection. For example, the connection management system 210 may enable activation of the service based on successfully testing the connection.

In some implementations, the one or more actions include updating the port status mapping to indicate that the port is occupied. For example, the connection management system 210 may update the port status mapping to include information indicating that a status of the port used to install the service is unavailable. In this way, the connection management system 210 may ensure that port status information is accurately maintained. Accurately maintaining port status information may conserve resources (e.g., human resources, vehicle resources, computing resources, and/or the like) by ensuring that a status of the connector panel is known (e.g., that the connector panel includes an available port) before a user is dispatched to the connector panel to establish a connection.

By determining the available ports based on the pre-install image of the connector panel, rather than based on data stored in a data structure, the connection management system 210 may not need to generate a circuit design. In this way, the connection management system 210 may conserve computing resources that would otherwise be utilized to query a data structure to identify available ports for each connector panel and/or to generate a circuit design based on the available ports.

Thus, the connection management system 210 reduces time required to establish a circuit and conserves computing resources, networking resources, human resources, and/or the like that would otherwise have been used to incorrectly identify a port on a connector panel as available, generate a circuit design, correct the circuit design, and/or the like.

As indicated above, FIGS. 2A-2E are provided as one or more examples. Other examples may differ from what is described with regard to FIGS. 2A-2E. The number and arrangement of devices shown in FIGS. 2A-2E are provided as an example. In practice, there may be additional devices, fewer devices, different devices, or differently arranged than those shown in FIGS. 2A-2E. Furthermore, two or more devices shown in FIGS. 2A-2E may be implemented within a single device, or a single device shown in FIGS. 2A-2E may be implemented as multiple, distributed devices. Additionally, or alternatively, a set of devices (e.g., one or more devices) shown in FIGS. 2A-2E may perform one or more functions described as being performed by another set of devices shown in FIGS. 2A-2E.

Figure 3:
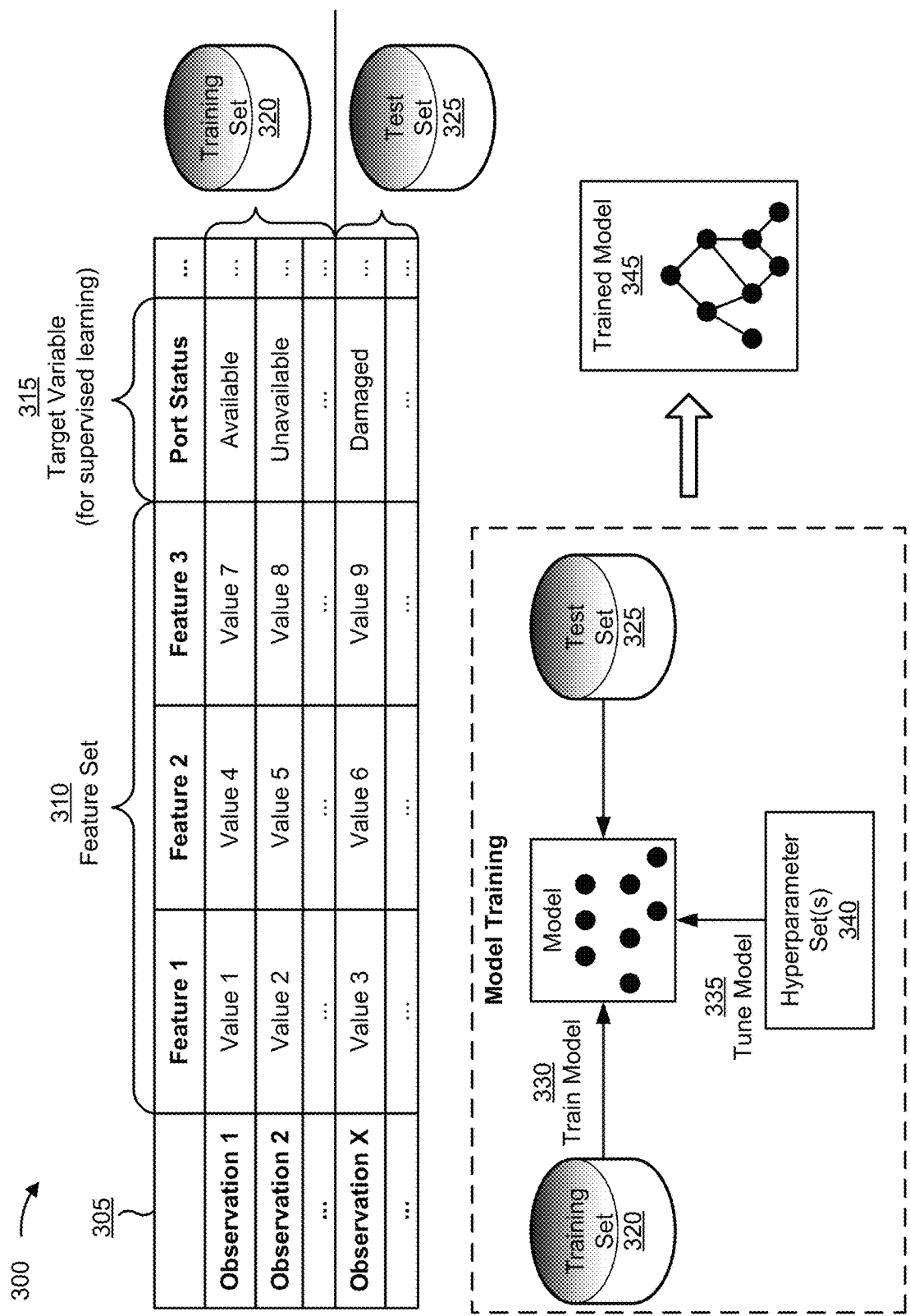
FIG. 3 is a diagram of illustrating an example of training a machine learning model in connection with managing physical connections of a connector panel.

FIG. 3 is a diagram illustrating an example 300 of training a machine learning model in connection with managing physical connections of a connector panel. The machine learning model training described herein may be performed using a machine learning system. The machine learning system may include or may be included in a computing device, a server, a cloud computing environment, and/or the like, such as connection management system 110, connection management system 210, and/or the like described in more detail below.

As shown by reference number 305, a machine learning model may be trained using a set of observations. The set of observations may be obtained and/or input from historical data, such as data gathered during one or more processes described herein. For example, the set of observations may include data gathered from user device 105 or user device 205, as described elsewhere herein. In some implementations, the machine learning system may receive the set of observations (e.g., as input) from connection management system 501.

As shown by reference number 310, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from connection management system 501. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from connection management system 501, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 315, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 300, the target variable is port status, which has a value of available for the first observation to indicate that the port is available for use in a circuit.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit, tune, and/or the like) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used, based on randomly generating hyperparameter values, and/or the like). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups, based on randomly selecting a number of groups, and/or the like) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, closest to a desired threshold, and/or the like) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 345.

As indicated above, FIG. 3 is provided as an example. Other examples may differ from what is described in connection with FIG. 3. For example, the machine learning model may be trained using a different process than what is described in connection with FIG. 3. Additionally, or alternatively, the machine learning model may employ a different machine learning algorithm than what is described in connection with FIG. 3, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 4:
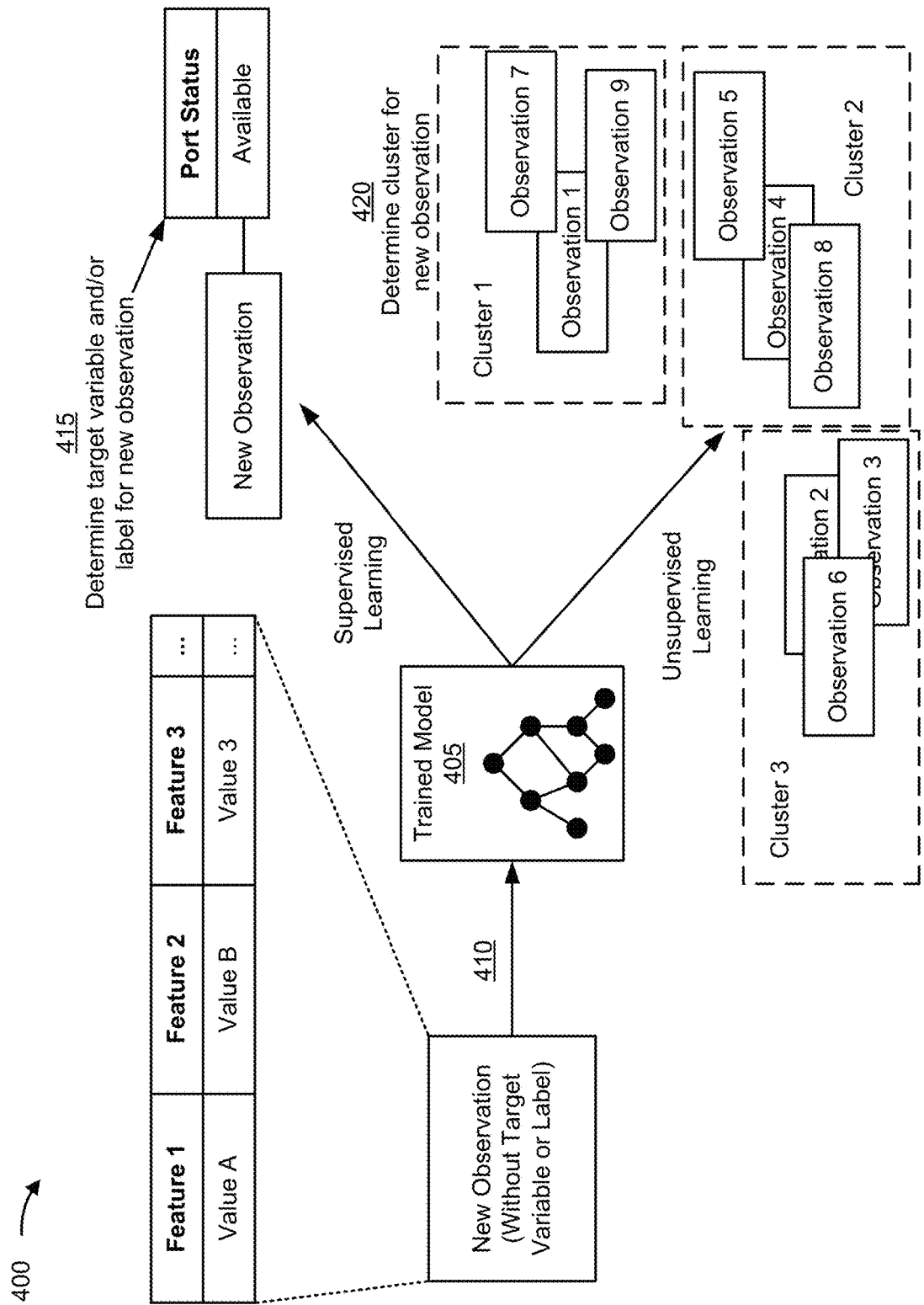
FIG. 4 is a diagram of illustrating an example of applying a trained machine learning model to a new observation associated with managing physical connections of a connector panel.

FIG. 4 is a diagram illustrating an example 400 of applying a trained machine learning model to a new observation associated with managing physical connections of a connector panel. The new observation may be input to a machine learning system that stores a trained machine learning model 405. In some implementations, the trained machine learning model 405 may be the trained machine learning model 345 described above in connection with FIG. 3. The machine learning system may include or may be included in a computing device, a server, a cloud computing environment, and/or the like, such as connection management system 110 and/or connection management system 210.

As shown by reference number 410, the machine learning system may receive a new observation (or a set of new observations), and may input the new observation to the machine learning model 405. The machine learning system may apply the trained machine learning model 405 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 405 may predict a value of available for the target variable of port status for the new observation, as shown by reference number 415. Based on this prediction (e.g., based on the value having a particular label or classification, based on the value satisfying or failing to satisfy a threshold, and/or the like), the machine learning system may provide a recommendation and/or output for determination of a recommendation, such as a recommendation to update a status of a particular port, a recommendation to utilize a port to establish a circuit, a recommendation to not use a port to establish a circuit, and/or the like. Additionally, or alternatively, the machine learning system may perform an automated action and/or may cause an automated action to be performed (e.g., by instructing another device to perform the automated action), such as updating a port status mapping, causing a modification to be made to a connector panel, designing a circuit that includes the port, and/or the like. As another example, if the machine learning system were to predict a value of unavailable for the target variable of port status, then the machine learning system may provide a different recommendation (e.g., a recommendation not to use the port to establish a circuit) and/or may perform or cause performance of a different automated action (e.g., identify an available port that can be used to establish the circuit). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 405 may classify (e.g., cluster) the new observation in a cluster, as shown by reference number 420. The observations within a cluster may have a threshold degree of similarity. As an example, if the machine learning system classifies the new observation in a first cluster (e.g., available ports), then the machine learning system may provide a first recommendation, such as a recommendation to use one of the available ports to establish a circuit. Additionally, or alternatively, the machine learning system may perform a first automated action and/or may cause a first automated action to be performed (e.g., by instructing another device to perform the automated action) based on classifying the new observation in the first cluster, such as updating a port status mapping to indicate the ports as being available. As another example, if the machine learning system were to classify the new observation in a second cluster (e.g., unavailable ports), then the machine learning system may provide a second (e.g., different) recommendation (e.g., a recommendation not to use the ports to establish a circuit) and/or may perform or cause performance of a second (e.g., different) automated action, such as causing a connector panel to be modified to include an additional port.

In this way, the machine learning system may apply a rigorous and automated process to determining a status of ports on a connection panel and managing physical connections of a connector panel based on the statuses of the ports. The machine learning system enables recognition and/or identification of tens, hundreds, thousands, or millions of features and/or feature values for tens, hundreds, thousands, or millions of observations, thereby increasing accuracy and consistency and reducing delay associated with determining a status of ports on a connection panel and managing physical connections of a connector panel based on the statuses of the ports relative to requiring computing resources to be allocated for tens, hundreds, or thousands of operators to manually determine a status of ports on a connection panel and manage physical connections of a connector panel based on the statuses of the ports using the features or feature values.

As indicated above, FIG. 4 is provided as an example. Other examples may differ from what is described in connection with FIG. 4.

Figure 5:
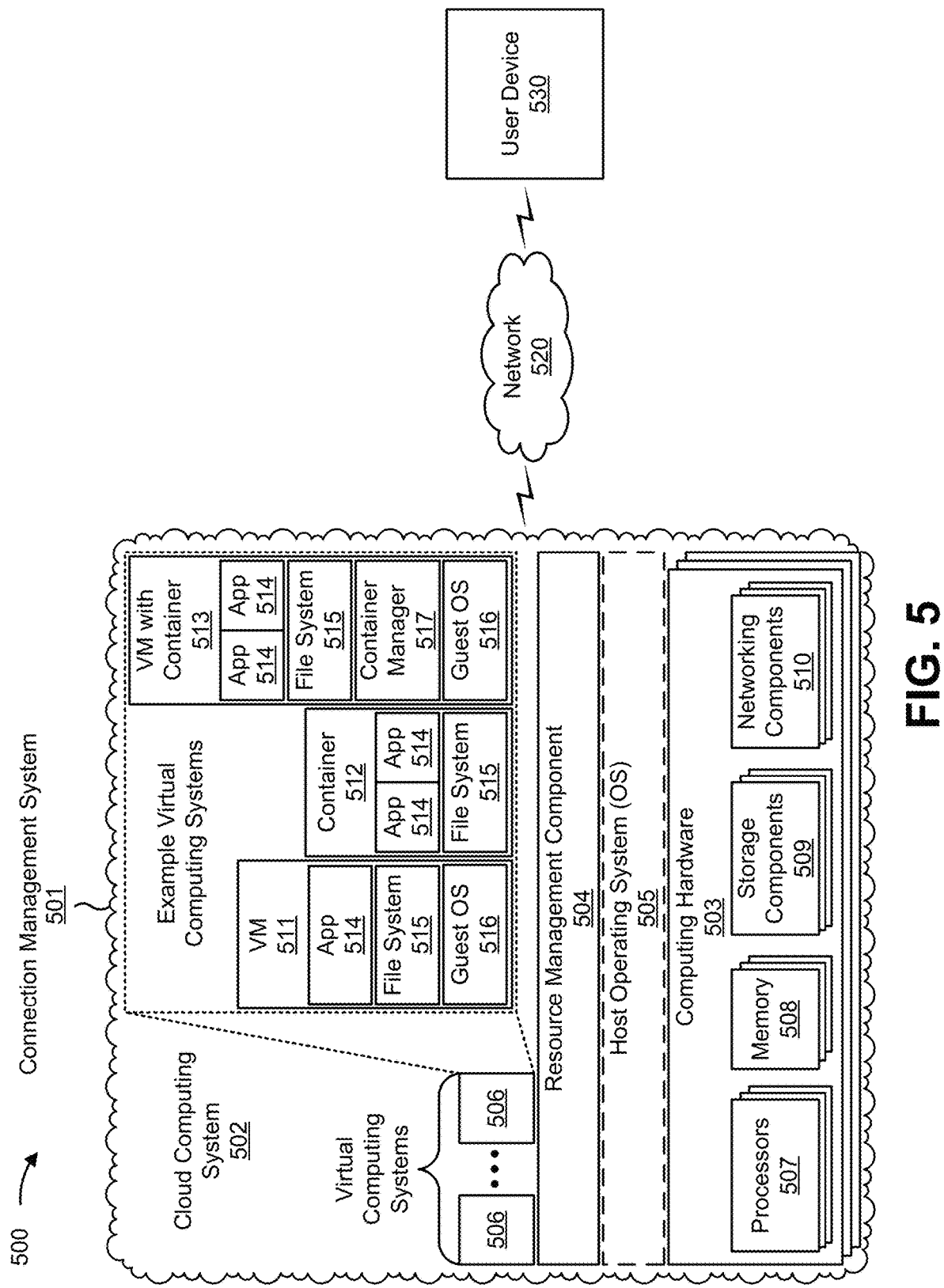
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a connection management system 501. In some implementations, the connection management system 501 corresponds to the connection management system 110 and/or the connection management system 210. The connection management system 501 may include one or more elements of a cloud computing system 502 and/or may execute within the cloud computing system 502 (e.g., as one or more virtual computing systems 506). The cloud computing system 502 may include one or more elements 503-517, as described in more detail below. As further shown in FIG. 5, environment 500 may include a network 520, and/or a user device 530. Devices of environment 500 may interconnect via wired connections, wireless connections, or a combination of wired and wireless connections.

The cloud computing system 502 includes computing hardware 503, a resource management component 504, a host operating system (OS) 505, and/or one or more virtual computing systems 506. The resource management component 504 may perform virtualization (e.g., abstraction) of computing hardware 503 to create the one or more virtual computing systems 506. Using such virtualization, the resource management component 504 enables a single computing device (e.g., a computer, a server, a host device, and/or the like) to operate as if the single computing device were multiple computing devices, such as by creating multiple isolated virtual computing systems 506 from computing hardware 503 of the single computing device. The multiple virtual computing systems 506 operate independently from one another and do not interact with one another. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server or host device) or from multiple computing devices (e.g., multiple servers or host devices), such as multiple computing devices in one or more data centers, server farms, server pools, and/or the like. As shown, computing hardware 503 may include one or more processors 507, one or more memories 508, one or more storage components 509, and/or one or more networking components 510. Computing hardware 503 may be interconnected via one or more wired and/or wireless buses, which may interconnect computing hardware 503 within a single computing device and/or across multiple computing devices.

A processor 507 includes a central processing unit, a graphics processing unit, and/or the like. A memory 508 includes random-access memory, read-only memory, and/or the like. The memory 508 may store a set of instructions (e.g., one or more instructions) for execution by the processor 507. The processor 507 may execute the set of instructions to perform one or more operations or processes described herein. In some implementations, execution of the set of instructions, by one or more processors 507, causes the one or more processors 507 and/or the connection management system 501 to perform one or more operations or processes described herein. A storage component 509 includes a hard disk or another type of storage device that stores information, data, and/or software (e.g., code, instructions, and/or the like) related to the operation and use of the connection management system 501. In some implementations, memory 508 and/or storage component 509 is/are implemented as a non-transitory computer readable medium. A networking component 510 includes a network interface and corresponding hardware that enables the connection management system 501 to communicate with other devices of environment 500 via a wired connection and/or a wireless connection, such as via network 520. Additional examples of a processor, a memory, a storage component, and a networking component (e.g., a communication interface) are described elsewhere herein.

The resource management component 504 includes a virtualization application (e.g., executing on hardware, such as computing hardware 503) capable of virtualizing computing hardware 503 to start (e.g., create or spin up), stop (e.g., delete or tear down), and/or manage one or more virtual computing systems 506. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 504 may control access to and/or use of computing hardware 503 and/or software executing on computing hardware 503. Additionally, or alternatively, the resource management component 504 may perform binary rewriting to scan instructions received from a virtual computing system 506 and replace any privileged instructions with safe emulations of those instructions. The resource management component 504 may include a hypervisor or a virtual machine monitor, such as when the virtual computing systems 506 are virtual machines 511. Additionally, or alternatively, the resource management component 504 may include a container manager, such as when the virtual computing systems 506 are containers 512.

In some implementations, the resource management component 504 executes within and/or in coordination with a host operating system 505. For example, the resource management component 504 may execute on top of the host operating system 505 rather than interacting directly with computing hardware 503, such as when the resource management component 504 is a hosted hypervisor (e.g., a Type 2 hypervisor) or a container manager. In this case, the host operating system 505 may control access to and/or use of computing hardware 503 and/or software executing on computing hardware 503 based on information and/or instructions received from the resource management component 504. Alternatively, the resource management component 504 may interact directly with computing hardware 503 rather than interacting with the host operating system 505, such as when the resource management component 504 is a bare-metal hypervisor (e.g., a Type 1 hypervisor). Thus, in some implementations, the cloud computing system 502 does not include a host operating system 505. In some implementations, the host operating system 505 includes and/or executes an administrator application to enable a system administrator to manage, customize, and/or configure cloud computing system 502.

A virtual computing system 506 includes a virtual environment that enables cloud-based execution of operations and/or processes described herein using computing hardware 503. As shown, a virtual computing system 506 may include a virtual machine 511, a container 512, a hybrid environment 513 that includes a virtual machine and a container, and/or the like. A virtual computing system 506 may execute one or more applications 514 using a file system 515. The file system 515 may include binary files, software libraries, and/or other resources required to execute applications 514 on a guest operating system 516 or the host operating system 505. In some implementations, a virtual computing system 506 (e.g., a virtual machine 511 or a hybrid environment 513) includes a guest operating system 516. In some implementations, a virtual computing system 506 (e.g., a container 512 or a hybrid environment 513) includes a container manager 517.

A virtual machine 511 is an emulation of a computing device that enables execution of separate, isolated instances of virtual computing devices (e.g., multiple virtual machines 511) on the same computing hardware 503. The guest operating systems 516 and applications 514 of multiple virtual machines 511 may share computing hardware 503 from a single computing device or from multiple computing devices (e.g., a pool of computing devices). Each separate virtual machine 511 may include a guest operating system 516, a file system 515, and one or more applications 514. With a virtual machine 511, the underlying computing hardware 503 is virtualized, and the guest operating system 516 executes on top of this virtualized hardware. Using virtual machines 511 enables different types of guest operating systems 516 to execute on the same computing hardware 503 in an isolated environment, but with more resource usage and overhead than containers 512.

Unlike a virtual machine 511, a container 512 virtualizes a host operating system 505 rather than the underlying computing hardware 503. Thus, a container 512 does not require a guest operating system 516 because the application (s) 514 included in the container 512 execute directly on the host operating system 505 using a file system 515 included in the container 512. Each separate container 512 may share the kernel of the host operating system 505, and different applications 514 within a single container 512 may share a file system 515. This sharing of a file system 515 among multiple applications 514 reduces the need to reproduce operating system code for different applications, and enables a single host operating system 505 to execute multiple applications 514 and/or containers 512. As a result, containers 512 enable a greater quantity of applications 514 to execute on a smaller quantity of computing devices as compared to virtual machines 511.

A hybrid environment 513 includes elements of a virtual machine 511 and a container 512. For example, a hybrid environment 513 may include a guest operating system 516 that executes on top of virtualized hardware. A container manager 517 may execute on top of the guest operating system 516 to start, stop, and/or manage one or more containers within the hybrid environment 513. Using a hybrid environment 513 enables different types of guest operating systems 516 to execute on the same computing hardware 503 in an isolated environment, while also enabling lightweight containers to execute on top of the guest operating system 516.

The quantity of applications 514 shown in FIG. 5 as executing within each virtual computing system 506 is shown as an example, and a different quantity of applications 514 may execute within each virtual computing system. Furthermore, although the connection management system 501 may include one or more elements 503-517 of the cloud computing system 502, may execute within the cloud computing system 502, and/or may be hosted within the cloud computing system 502, in some implementations, the connection management system 501 may not be cloud-based (e.g., may be implemented outside of a cloud computing system) or may be partially cloud-based. For example, the connection management system 501 may include one or more devices that are not part of the cloud computing system 502, such as device 600 of FIG. 6, which may include a standalone server or another type of computing device. The connection management system 501 may perform one or more operations and/or processes described in more detail elsewhere herein.

Network 520 includes one or more wired and/or wireless networks. For example, network 520 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 520 enables communication among the devices of environment 500.

User device 530 includes one or more devices capable of receiving, generating, storing, processing, and/or providing information associated with managing physical connections of a connector panel, as described elsewhere herein. The user device 530 may include a communication device and/or a computing device. For example, the user device 530 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 530 may communicate with one or more other devices of environment 500, as described elsewhere herein. In some implementations, the user device 530 may correspond to the user device 105. In some implementations, the user device 530 may correspond to the user device 205.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
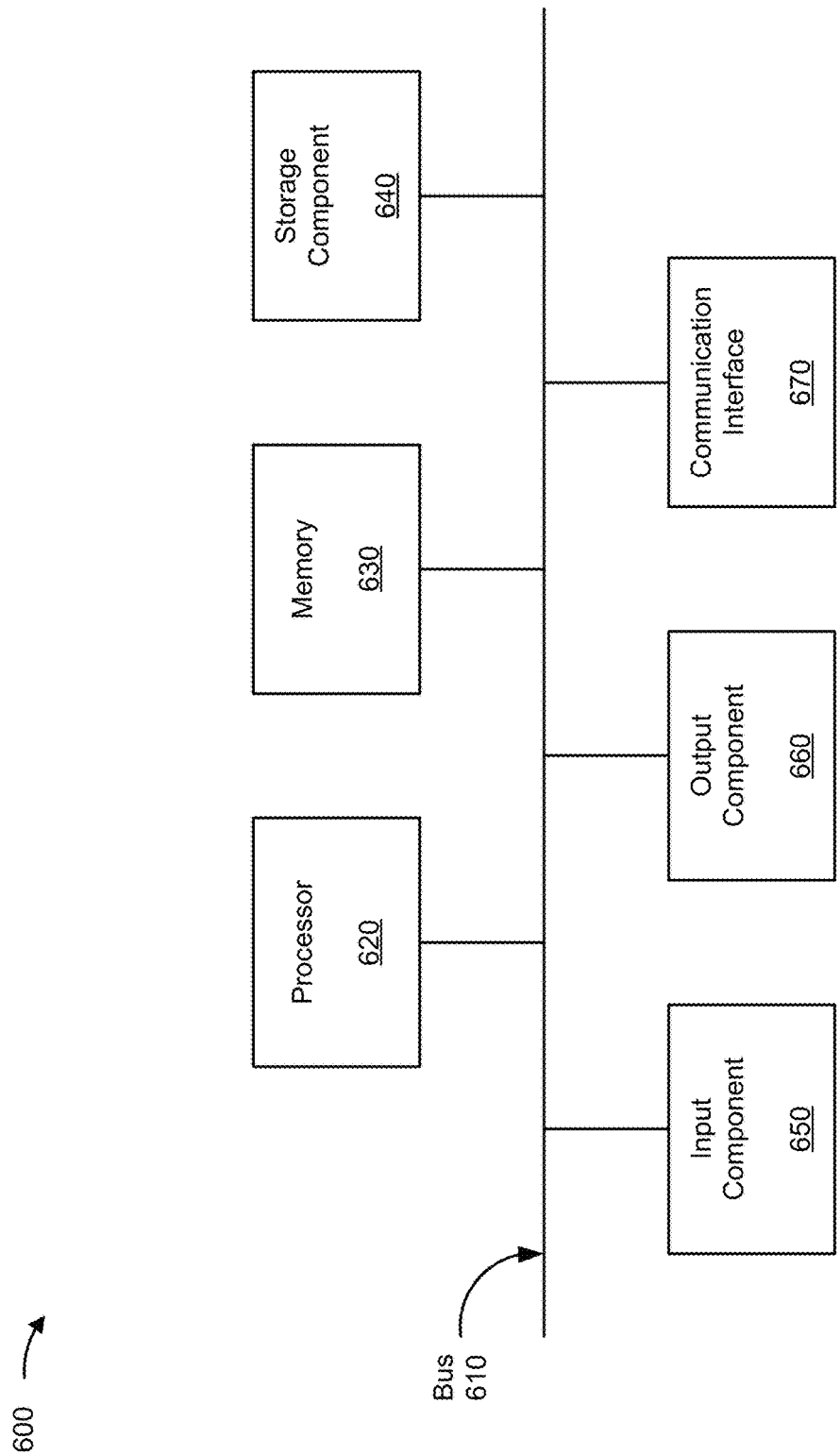
FIG. 6 is a diagram of example components of one or more devices of FIG. 5.

FIG. 6 is a diagram of example components of a device 600. Device 600 may correspond to connection management system 501 and/or user device 530. In some implementations, connection management system 501 and/or user device 530 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more LEDs).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, an RF interface, a universal serial bus (USB) interface, a wireless local area interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
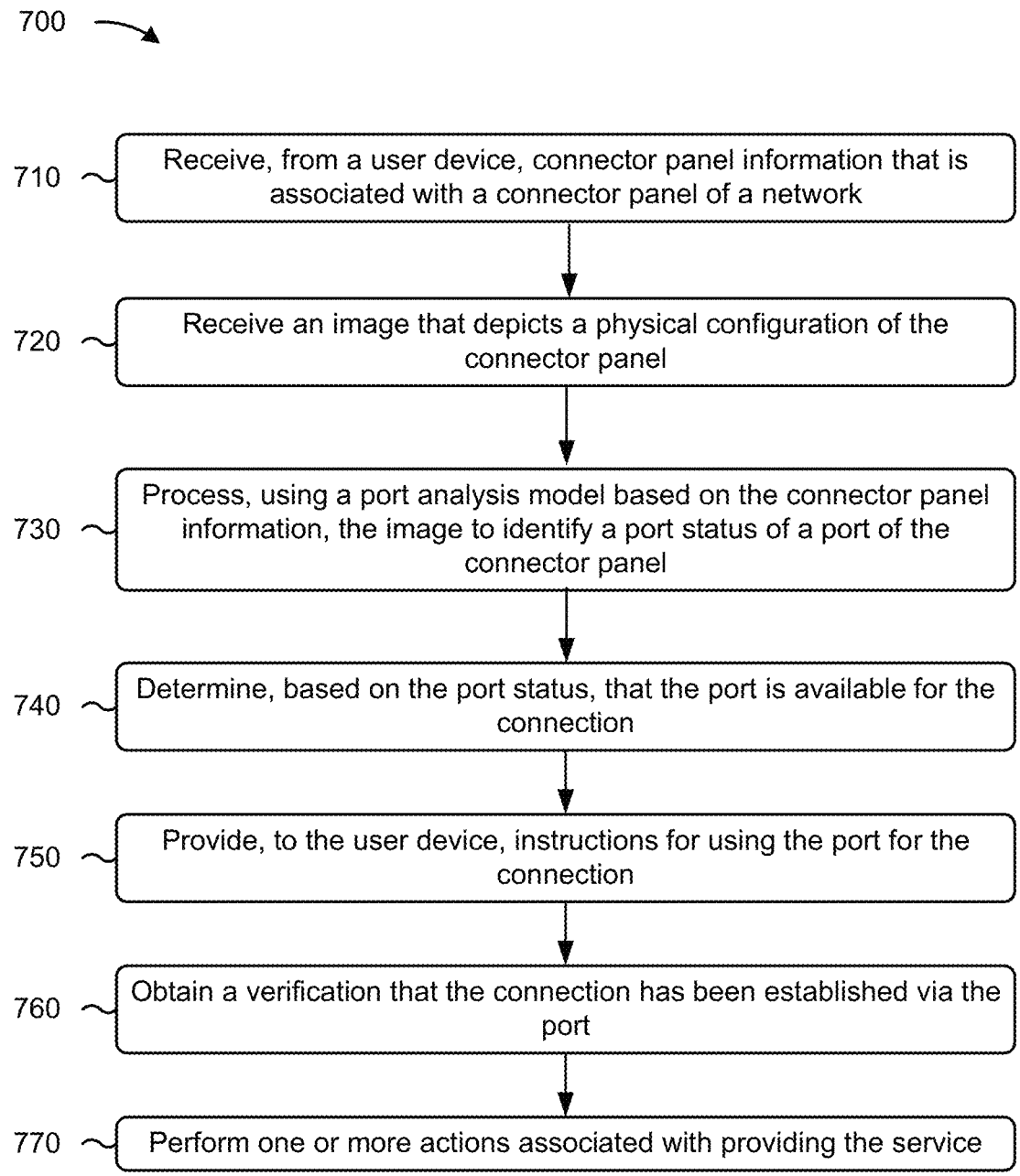
FIG. 7 is a flow chart of an example process relating to managing physical connections of a connector panel.

FIG. 7 is a flow chart of an example process 700 associated with systems and methods for managing physical connections of a connector panel. In some implementations, one or more process blocks of FIG. 7 may be performed by a device (e.g., connection management system 110, connection management system 210, connection management system 501, and/or the like). In some implementations, one or more process blocks of FIG. 7 may be performed by another device or a group of devices separate from or including the device, such as a user device (e.g., user device 105, user device 205, user device 530, and/or the like) and/or the like. Additionally, or alternatively, one or more process blocks of FIG. 7 may be performed by one or more components of a device 600, such as processor 620, memory 630, storage component 640, input component 650, output component 660, communication interface 670, and/or the like.

As shown in FIG. 7, process 700 may include receiving, from a user device, connector panel information that is associated with a connector panel of a network (block 710). For example, the device may receive, from a user device, connector panel information that is associated with a connector panel of a network, as described above. In some implementations, the connector panel is to provide a connection, via a port, for a service of the network.

The connection panel information may include at least one of a type of the connector panel, a site of the connector panel, a port configuration of the connector panel, or an identifier of the connector panel.

In some implementations, process 700 includes verifying the connector panel information based on location information associated with the user device; and providing, to the user device and via a service installation application, a prompt to receive the image, wherein the image is being received in association with the prompt.

The service installation application may be configured to provide, via the user interface, a series of instructions for establishing the connection via the port based on one or more interactions with the user device. The port may be designated specifically for the connection of the service for a particular customer.

As further shown in FIG. 7, process 700 may include receiving an image that depicts a physical configuration of the connector panel (block 720). For example, the device may receive an image that depicts a physical configuration of the connector panel, as described above.

In some implementations, receiving the image comprises receiving, from the user device, the image as a frame of a live video stream that depicts the physical configuration of the connector panel, and providing the instructions for using the port comprises: providing rendering data associated with augmenting the instructions within the live video stream and causing the user device to identify the port via a display of the user device.

As further shown in FIG. 7, process 700 may include processing, using a port analysis model based on the connector panel information, the image(s) to identify a port status of a port of the connector panel (block 730). For example, the device may process, using a port analysis model based on the connector panel information, the image to identify a port status of a port of the connector panel, as described above. In some implementations, the port analysis model uses multiple images of the port to identify a status of the port. The port analysis model may use images captured at multiple angles to ensure that a view of the port is not blocked by another object (e.g., a cable). The port analysis model may use multiple images to increase an accuracy associated with identifying the port status of the port. For example, the port analysis model may use the multiple images perform a process for reducing or removing noise from the images. In some implementations, the port analysis model is trained based on a plurality of historical images of other physical configurations of other connector panels that are associated with the connector panel information.

In some implementations, prior to processing the image, process 700 may include selecting the port analysis model from a plurality of port analysis models based on the connector panel information.

In some implementations, the port analysis model comprises a computer vision model that is configured to identify the individual ports of the connector panel based on at least one of: detecting a particular shape depicted in the image that corresponds to a port that is unoccupied, or detecting a particular shape depicted in the image that corresponds to a port that is occupied.

As further shown in FIG. 7, process 700 may include determining, based on the port status, that the port is available for the connection (block 740). For example, the device may determine, based on the port status, that the port is available for the connection, as described above.

As further shown in FIG. 7, process 700 may include providing, to the user device, instructions for using the port for the connection (block 750). For example, the device may provide, to the user device, instructions for using the port for the connection, as described above.

As further shown in FIG. 7, process 700 may include obtaining a verification that the connection has been established via the port (block 760). For example, the device may obtain a verification that the connection has been established via the port, as described above.

In some implementations, the image may comprise a first image and obtaining the verification may include providing a request to the user device to provide a second image of the physical configuration after the connection has been established with the port. Further, the user device may receive, in association with the request, the second image, process, using the port analysis model, the second image to verify that the port is occupied, and obtain the verification based on verifying that the port is occupied.

Process 700 may include generating a port status mapping. The port status mapping may be generated by obtaining a port identifier mapping of the individual ports; and mapping the port statuses to corresponding port identifiers of the individual ports, based on configurations of the port identifier mapping and the image to generate the port status mapping.

As further shown in FIG. 7, process 700 may include performing one or more actions associated with providing the service (block 770). For example, the device may perform one or more actions associated with providing the service, as described above.

In some implementations, performing the one or more actions comprises processing, using the port analysis model, the image to identify port statuses of a plurality of additional ports of the connector panel; updating, based on the port status, a port status mapping for the connector panel, the port status mapping is associated with an availability of the service via the connector panel, and storing the port status mapping to facilitate management of a physical infrastructure of the network.

Additionally, and/or alternatively, performing the one or more actions may comprise at least one of: providing a notification to the user device that the connection at the connector panel is correct, testing the connection to the port via a test signal, enabling activation of the service via the connection, or updating a port status mapping to indicate that the port is occupied.

Alternatively, and/or additionally, performing the one or more actions may include providing, based on the port status mapping, a notification that identifies whether the connector panel is available or unavailable to establish a connection for the service, causing a modification to the connector panel based on the port status mapping, causing a technician to be dispatched to the connector panel to address an issue with the connector panel, causing an autonomous device to be dispatched to the connector panel to address the issue with the connector panel, or storing the port status mapping for management of the network.

In some implementations, the connection is a first connection, the port is a first port, the image is a first image, and the port status is a first port status, and process 700 may include processing, using the port analysis model, the image to identify a second port status of a second port of the connector panel; determining, based on the second port status, that the second port is unavailable for a second connection for the service; processing, using the port analysis model, the image to identify a third port that is available for the second connection, and providing, to the user device, a port identifier that is associated with the third port to permit the second connection to be established via the third port.

The first port status may indicate that the first port is available and the second port status may indicate that the second port is at least one of: occupied by a line connector, or damaged.

In some implementations, process 700 includes determining, based on the response, that the port status is not verified; and providing, as training data for the port analysis model, an image of the port, the port status, and an indication that the port status is not verified.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a user device, connector panel information that is associated with a connector panel of a network,
     wherein the connector panel is to provide a connection, via a port, for a service of the network;
   receiving, by the device, an image that depicts a physical configuration of the connector panel;
   processing, by the device and using a port analysis model based on the connector panel information, the image to identify a port status of a port of the connector panel,
     wherein the port analysis model is trained based on a plurality of historical images of other physical configurations of other connector panels that are associated with the connector panel information;
   determining, by the device and based on the port status, that the port is available for the connection;
   providing, by the device and to the user device, instructions for using the port for the connection;
   obtaining, by the device, a verification that the connection has been established via the port; and
   performing, by the device, one or more actions associated with providing the service.

2. The method of claim 1, wherein the connector panel information includes at least one of:
   a type of the connector panel,
   a site of the connector panel,
   a port configuration of the connector panel, or
   an identifier of the connector panel.

3. The method of claim 1, further comprising, prior to receiving the image:
   verifying the connector panel information based on location information associated with the user device; and
   providing, to the user device and via a service installation application, a prompt to receive the image,
     wherein the image is received in association with the prompt.

4. The method of claim 3, wherein the service installation application is configured to provide, via the user device, a series of instructions for establishing the connection via the port based on one or more interactions with the user device,
   wherein the port is designated specifically for the connection of the service for a particular customer.

5. The method of claim 1, wherein receiving the image comprises:
   receiving, from the user device, the image as a frame of a live video stream that depicts the physical configuration of the connector panel, and
   wherein providing the instructions for using the port comprises:
     providing rendering data associated with augmenting the instructions within the live video stream and causing the user device to identify the port via a display of the user device.

6. The method of claim 1, wherein the image comprises a first image, and
   wherein obtaining, by the device, the verification comprises:
     providing a request to the user device to provide a second image of the physical configuration after the connection has been established with the port;
     receiving, in association with the request, the second image;
     processing, using the port analysis model, the second image to verify that the port is occupied; and
     obtaining the verification based on verifying that the port is occupied.

7. The method of claim 1, wherein performing the one or more actions comprises:
   processing, using the port analysis model, the image to identify port statuses of a plurality of additional ports of the connector panel;
   updating, based on the port status, a port status mapping for the connector panel,
     wherein the port status mapping is associated with an availability of the service via the connector panel; and
   storing the port status mapping to facilitate management of a physical infrastructure of the network.

8. The method of claim 1, wherein the connection is a first connection, the port is a first port, the image is a first image, and the port status is a first port status, wherein the method further comprises:
processing, using the port analysis model, the image to identify a second port status of a second port of the connector panel;
determining, based on the second port status, that the second port is unavailable for a second connection for the service;
processing, using the port analysis model, the image to identify a third port that is available for the second connection; and
providing, to the user device, a port identifier that is associated with the third port to permit the second connection to be established via the third port.

9. The method of claim 8, wherein the first port status indicates that the first port is available and the second port status indicates that the second port is at least one of:
occupied by a line connector, or
damaged.

10. The method of claim 1, wherein performing the one or more actions comprises at least one of:
providing a notification to the user device that the connection at the connector panel is correct,
testing the connection to the port via a test signal,
enabling activation of the service via the connection, or
updating a port status mapping to indicate that the port is occupied.

11. A device, comprising:
one or more processors configured to:
receive connector panel information that is associated with a connector panel of a network that provides a service;
receive an image that depicts a physical configuration of the connector panel;
process, using a port analysis model, the image to identify port statuses of individual ports of the connector panel,
wherein the port analysis model is trained based on a plurality of historical images of other physical configurations of other connector panels;
update, based on the port statuses, a port status mapping for the connector panel,
wherein the port status mapping is associated with service availability via the connector panel; and
perform one or more actions associated with the port status mapping and the network.

12. The device of claim 11, wherein the port analysis model comprises a computer vision model that is configured to identify the individual ports of the connector panel based on at least one of:
detecting a particular shape depicted in the image that corresponds to a port that is unoccupied, or
detecting a particular shape depicted in the image that corresponds to a port that is occupied.

13. The device of claim 11, wherein the one or more processors are further configured to:
prior to processing the image, select the port analysis model from a plurality of port analysis models based on the connector panel information.

14. The device of claim 11, wherein the one or more processors, when generating the port status mapping, are configured to:
obtain a port identifier mapping of the individual ports; and
map the port statuses to corresponding port identifiers of the individual ports, based on configurations of the port identifier mapping and the image to generate the port status mapping.

15. The device of claim 11, wherein the one or more processors, when performing the one or more actions, are configured to at least one of:
provide, based on the port status mapping, a notification that identifies whether the connector panel is available or unavailable to establish a connection for the service,
cause a modification to the connector panel based on the port status mapping,
cause a technician to be dispatched to the connector panel to address an issue with the connector panel,
cause an autonomous device to be dispatched to the connector panel to address the issue with the connector panel, or
store the port status mapping for management of the network.

16. A non-transitory computer-readable medium storing instructions, the instructions comprising:
one or more instructions that, when executed by one or more processors, cause the one or more processors to:
receive an image that depicts a physical configuration of a connector panel;
process, using a port analysis model, the image to identify a port status of a port of the connector panel,
wherein the port analysis model is trained based on a plurality of historical images of other physical configurations of other connector panels,
wherein the port status is associated with whether the port is available for a connection of a service via the connector panel;
provide a request for a verification of the port status;
receive a response to the request that is associated with verifying the port status; and
training the port analysis model based on the response.

17. The non-transitory computer-readable medium of claim 16, wherein the port status indicates that the port is at least one of:
occupied,
available, or
damaged.

18. The non-transitory computer-readable medium of claim 16, wherein the request includes the image, an identifier of the port, and the port status.

19. The non-transitory computer-readable medium of claim 16, wherein the one or more instructions, that cause the one or more processors to train the port analysis model, cause the one or more processors to:
determine, based on the response, that the port status is verified; and
provide, as training data for the port analysis model, an image of the port, the port status, and an indication that the port status is verified.

20. The non-transitory computer-readable medium of claim 16, wherein the one or more instructions, that cause the one or more processors to train the port analysis model, cause the one or more processors to:
determine, based on the response, that the port status is not verified; and
provide, as training data for the port analysis model, an image of the port, the port status, and an indication that the port status is not verified.

* * * * *